US009862793B2

(12) United States Patent
Shimizu et al.

(10) Patent No.: US 9,862,793 B2
(45) Date of Patent: Jan. 9, 2018

(54) METHOD FOR PRODUCING A POLYMER, POLYMER SOLUTION AND POLYMER

(71) Applicant: Asahi Kasei Chemicals Corporation, Tokyo (JP)

(72) Inventors: Daisuke Shimizu, Tokyo (JP); Kenta Shibuya, Tokyo (JP); Takuya Suzuki, Tokyo (JP)

(73) Assignee: Asahi Kasei Cehmicals Corporation, Tokyo (JP)

( * ) Notice: Subject to any disclaimer, the term of this patent is extended or adjusted under 35 U.S.C. 154(b) by 0 days.

(21) Appl. No.: 14/440,776

(22) PCT Filed: May 13, 2013

(86) PCT No.: PCT/JP2013/063327
§ 371 (c)(1),
(2) Date: May 5, 2015

(87) PCT Pub. No.: WO2014/073230
PCT Pub. Date: May 15, 2014

(65) Prior Publication Data
US 2015/0299370 A1    Oct. 22, 2015

(30) Foreign Application Priority Data

Nov. 6, 2012  (JP) ................. 2012-244624
Nov. 6, 2012  (JP) ................. 2012-244626

(51) Int. Cl.
C08F 6/06       (2006.01)
C08F 6/08       (2006.01)
C08F 8/04       (2006.01)
C08F 299/02     (2006.01)
C08F 6/00       (2006.01)
C08F 6/02       (2006.01)

(52) U.S. Cl.
CPC ............ C08F 299/02 (2013.01); C08F 6/008 (2013.01); C08F 6/02 (2013.01); C08F 6/06 (2013.01)

(58) Field of Classification Search
CPC .. C08F 293/00; C08F 6/02; C08F 8/04; C08F 6/06; C08F 6/008; C08F 29/02; C08C 19/02; C08C 2/04
See application file for complete search history.

(56) References Cited

U.S. PATENT DOCUMENTS

| 3,531,448 | A | 9/1970 | Johnson |
| 4,595,749 | A | 6/1986 | Hoxmeier |
| 5,089,541 | A | 2/1992 | Madgavkar et al. |
| 5,104,972 | A | 4/1992 | Madgavkar et al. |
| 2002/0099149 | A1 | 7/2002 | Ko |

FOREIGN PATENT DOCUMENTS

| EP | 1209169 A1 | 5/2002 |
| EP | 1752473 A1 | 2/2007 |
| EP | 2048164 A | 4/2009 |
| JP | 06136034 A | 5/1994 |
| JP | H06-136034 | 5/1994 |
| JP | 08269126 A | 10/1996 |
| JP | 2002167406 A | 6/2002 |
| JP | 2002356509 A | 12/2002 |
| JP | 2003002917 A | 1/2003 |
| JP | 2009091574 A | 4/2009 |

OTHER PUBLICATIONS

Supplemental European Search Report issued in the related European Patent Application No. 13853390.6 dated Sep. 23, 2015.
International Preliminary Report on Patentability issued in PCT/JP2013/063327 dated May 12, 2015.
International Search Report issued in corresponding International Patent Application No. PCT/JP2013/063327 dated Aug. 13, 2013.
United States Statutory Invention Registration No. H1303 published on Apr. 5, 1994.

*Primary Examiner* — Irina S Zemel
*Assistant Examiner* — Jeffrey Lenihan
(74) *Attorney, Agent, or Firm* — Morgan, Lewis & Bockius LLP

(57) ABSTRACT

The present invention provides a method for producing a polymer by efficiently removing residue of metals such as titanium, aluminum and lithium from a polymer solution containing the residue of these metals to successfully obtain a purified polymer solution containing a smaller amount of the metal residue and having satisfactory color tone and transparency, a polymer solution and a polymer obtained by the production method.

12 Claims, No Drawings

METHOD FOR PRODUCING A POLYMER, POLYMER SOLUTION AND POLYMER

TECHNICAL FIELD

The present invention relates to a method for producing a polymer, a polymer solution and polymer obtained by the production method.

BACKGROUND ART

A polymer of a conjugated diene such as 1,3-butadiene and isoprene or a copolymer formed of a conjugated diene with a vinyl aromatic monomer (copolymerizable with a conjugated diene) such as styrene, has been widely used as an elastomer.

Such a (block) copolymer of a conjugated diene and a vinyl aromatic monomer is a thermoplastic elastomer which will not be vulcanized and used as a modifier of an impact resistant transparent resin, a polyolefin or a polystyrene resin. However, a polymer containing an olefinic unsaturated double bond has a problem in stability such as heat resistance, oxidation resistance and weather resistance due to reactivity of a double bond. Because of this, the polymer containing an olefinic unsaturated double bond is used within a limited range where the polymer is not exposed to sunlight and high temperature. Under the circumstances, in order to improve durability and oxidation resistance of the polymer, it has known that the polymer is modified by adding hydrogen to double bonds within the polymer to partially or wholly saturate them and put in use.

Various reports have been made on a general method for hydrogenating a polymer having an olefinic double bond. The hydrogenation methods are roughly divided into the following two types. The first one is a method of using a non-homogeneous catalyst such as a metal-carrying catalyst in which a noble metal such as platinum, palladium and rhodium is carried by e.g., carbon, silica or alumina. The second one is a method of using a Ziegler catalyst using nickel or cobalt, or a homogeneous catalyst such as an organic metal compound such as rhodium and titanium.

A hydrogenation reaction using a non-homogeneous catalyst has a drawback in that the hydrogenation reaction must be performed at a high temperature-high pressure condition and the catalyst being expensive must be recycled by recovering it after completion of the reaction by a filter; and has another drawback in that cost for a reaction facility is expensive. In contrast, a hydrogenation reaction using a homogeneous catalyst has advantages: since the activity of the catalyst is high, a high-yield hydrogenation reaction can be expected with a trace amount even in mild conditions such as a low temperature-low pressure condition; and facility cost is low. However, the hydrogenation reaction using a homogeneous catalyst has a drawback in that it is difficult to separate the homogeneous catalyst from a product after the reaction.

Many methods have been already known for the hydrogenation reaction using a homogeneous catalyst. Examples of the methods known in the art may include a hydrogenation method using a catalyst, which employs a compound of a metal of the VIII family of the periodic table, in particular, nickel or cobalt, in combination with an appropriate reducing agent such as an alkylaluminum compound; and a method of hydrogenating a unsaturated double bond of a conjugated diene polymer by use of a catalyst, which employs a bis(cyclopentadienyl)titanium compound in combination with an appropriate reducing agent such as an alkylaluminum compound.

The hydrogenation reaction using a homogeneous catalyst can generally realize a high hydrogenation rate and a high reproducibility, even with a small amount; however, there is still a problem in that catalyst residue in a polymer solution after the hydrogenation reaction is not easily removed. The metal component remaining in a polymer causes a reaction upon being exposed to air or UV rays, decomposes the polymer and deteriorates hue of a final polymer, reducing a commercial value. For the reasons, the metal component is desired to be removed. Generally a homogeneous catalyst is rarely separated by a physical means such as filtration performed after the reaction and must be separated by a chemical reaction.

Then, to solve this problem, several proposals have been made on a method for removing metal residue of a homogeneous catalyst remaining in a polymer solution. For example, to remove a catalyst consisting of a metal of the VIII family of the periodic table, such as nickel, Patent Literature 1 discloses a method for removing residue by treating it with an oxidizer and a dicarboxylic acid; Patent Literature 2 discloses a method for removing a catalyst by adsorbing an oxidized metal to a silicate; Patent Literature 3 discloses a method of removing a nickel catalyst reacted with oxygen by adsorbing it to active carbon; and Patent Literature 4 discloses a method of removing a nickel catalyst by use of aluminum phosphate.

So far, little has been known about a method for removing titanium residue. For example, Patent Literature 5 discloses removal of titanium residue by an inorganic acid, an alcohol and water; and Patent Literature 6 discloses removal of titanium residue by an organic acid, an alcohol and water. These are the matters just known in the art.

CITATION LIST

Patent Literature

Patent Literature 1: U.S. Pat. No. 4,595,749
Patent Literature 2: U.S. Pat. No. 5,104,972
Patent Literature 3: U.S. Pat. No. 5,089,541
Patent Literature 4: U.S. Pat. No. 3,531,448
Patent Literature 5: Japanese Patent Laid-Open No. 2002-167406
Patent Literature 6: Japanese Patent Laid-Open No. 2009-91574

SUMMARY OF INVENTION

Technical Problem

However, in the methods disclosed in Patent Literatures 5 and 6, a large amount of alcohol and water must be used for removing metal and waste water treatment becomes a serious problem in view of industrial production. Even if alcohol and water are recycled, a large-scale equipment is required for purification. In addition, productivity is a problem since a long time is required for separating a polymer solution and alcohol from each other in a metal removing process.

To obtain a product having excellent stability and quality, it is required to develop a method for totally removing metal residue including not only titanium residue but also aluminum residue derived from an aluminum compound generally employed as a reducing agent for a titanium compound as well as lithium residue derived from a polymerization initiator for a base polymer.

However, a method for efficiently removing metal residue from a polymer solution without using alcohol has not yet been disclosed at all.

Then, in view of the above problems, the present invention provides a method for producing a polymer in which residue of metals such as titanium, aluminum and lithium is removed from a polymer solution containing the metal residue to successfully obtain a purified polymer solution containing a smaller amount of metal residue and having satisfactory color tone and transparency, a polymer solution and polymer obtained by the production method.

Solution to Problem

The present inventors conducted intensive studies with a view to solving the aforementioned problems. As a result, it has been found that metal residue in a polymer solution can be efficiently removed in a short time, for example, by mixing water with a solution of a polymer, which is obtained by hydrogenating an unsaturated double bond of a conjugated diene polymer by use of a homogeneous catalyst formed of an organic titanium compound in combination with an aluminum reducing agent; bringing catalyst residue and water into contact with each other such that the water phase of the solution mixture of catalyst residue and water reaches a predetermined pH; and separating and removing water from the obtained solution mixture. Based on the finding, the present invention was accomplished.

More specifically, the present invention is as follows.

[1]
A method for producing a polymer, comprising
step 1 of preparing a polymer solution containing one or more metals selected from the group consisting of aluminum, lithium and titanium; and
step 2 of obtaining a solution mixture by mixing the polymer solution and water in a volume ratio of 0.1 to 10 based on the polymer solution,
wherein
in the step 1, when an aluminum content in a polymer contained in the polymer solution is less than 30 ppm, a pH of a water phase of the solution mixture is controlled to be 10 or less in the step 2, and
in the step 1, when the aluminum content in the polymer contained in the polymer solution is 30 ppm or more and 200 ppm or less, the pH of the water phase of the solution mixture is controlled to be 5.5 or less, or 7 to 10 in the step 2.

[2]
The method for producing the polymer according to [1], wherein the polymer solution in the step 1 contains titanium.

[3]
The method for producing the polymer according to [1] or [2] wherein the polymer solution in the step 1 contains lithium and titanium.

[4]
The method for producing the polymer according to any one of [1] to [3], further comprising, after the step 2, step 3 of applying centrifugal acceleration to the solution mixture.

[5]
The method for producing the polymer according to any one of [1] to [4], wherein, in the step 2, the mixing of the polymer solution and the water is performed in a condition: $(P/V) \cdot T \geq 100$ wherein P represents a power (kw), V represents a volume ($m^3$) and T represents a mixing time (sec).

[6]
The method for producing the polymer according to any one of [1] to [5], wherein, in the step 2, the mixing of the polymer solution and the water is performed in the condition: $30000 \geq (P/V) \cdot T \geq 1000$ wherein P represents a power (kw), V represents a volume ($m^3$) and T represents a mixing time (sec).

[7]
The method for producing the polymer according to any one of [4] to [6], comprising, after the step 2 and before the step 3, step A of separating and removing the water phase from the solution mixture.

[8]
The method for producing the polymer according to any one of [1] to [7], wherein, in the step 2, the pH of the water phase of the solution mixture is controlled to be 7 to 8.5.

[9]
The method for producing the polymer according to any one of [1] to [8], wherein, in the step 2, an inorganic acid is further mixed.

[10]
The method for producing the polymer according to [9], wherein the inorganic acid comprises at least one selected from the group consisting of hydrochloric acid, sulfuric acid, nitric acid and phosphoric acid.

[11]
The method for producing the polymer according to any one of [1] to [10], wherein, in the step 2, a content of an alcohol in the solution mixture is 5% or less.

[12]
The method for producing the polymer according to any one of [4] to [11], wherein, in the step 3, centrifugal acceleration is applied in a condition of $0.01 \leq (G \cdot T2) \leq 5000$ where G represents a centrifugal acceleration rate and T2 represents a centrifugation time (hr).

[13]
A polymer solution obtained by the method for producing the polymer according to any one of [1] to [12].

[14]
A polymer contained in the polymer solution according to [13].

Advantageous Effects of Invention

According to the present invention, it is possible to provide a method for producing a polymer by efficiently removing residue of metals such as titanium, aluminum and lithium from a polymer solution containing the residue of these metals to successfully obtain a purified polymer solution containing a smaller amount of the metal residue and having satisfactory color tone and transparency, a polymer solution and a polymer obtained by the production method.

DESCRIPTION OF EMBODIMENTS

Now, the embodiment of the present invention (hereinafter referred to as "the present embodiment") will be more specifically described; however, the present invention is not limited to the following embodiment and can be modified in various ways within the gist of the invention and carried out.

[Method for Producing a Polymer]

The method for producing a polymer according to the present embodiment comprises
step 1 of preparing a polymer solution containing one or more metals selected from the group consisting of aluminum, lithium and titanium; and step 2 of obtaining a solution mixture by mixing the polymer solution and water in a volume ratio of 0.1 to 10 based on the polymer solution, wherein in the step 1, when the aluminum content in a polymer contained in the polymer solution is less than 30 ppm, a pH of a water phase of the solution mixture is controlled to be 10 or less in the step 2, and in the step 1, when the aluminum content in the polymer contained in the polymer solution is 30 ppm or more and 200 ppm or less, the pH of the water phase of the solution mixture is controlled to be 5.5 or less, or 7 to 10 in the step 2.

[Step 1]

In the method for producing a polymer according to the present embodiment, step 1 is a step of preparing a polymer solution containing one or more metals selected from the group consisting of aluminum, lithium and titanium. A method for preparing the polymer solution is not particularly limited; however, a polymer solution containing lithium can be obtained if a polymer is obtained by using, for example, a lithium polymerization initiator. The polymer solution thus prepared does not contain aluminum and contains only lithium. If the polymer solution is subjected to a hydrogenation reaction in the presence of a catalyst containing a titanium compound, a polymer solution containing titanium can be obtained. Furthermore, when the polymer is subjected to a hydrogenation reaction, if a reducing agent containing aluminum is used together with the catalyst, a polymer solution containing aluminum can be obtained.

In view of productivity and economic aspects, the polymer solution preferably contains titanium and more preferably lithium and titanium.

The content of lithium in the polymer of the polymer solution prepared in step 1 is preferably 1 to 1000 ppm, more preferably 1 to 500 ppm and further preferably 1 to 200 ppm. The method for producing a polymer according to the present embodiment further more effectively works if the content of lithium in the polymer of the polymer solution falls within the above range and a highly pure polymer solution having a smaller amount of metal residue can be obtained.

The content of titanium in the polymer of the polymer solution prepared in step 1 is preferably 1 to 500 ppm, more preferably 1 to 300 ppm and further preferably 1 to 100 ppm. The method for producing a polymer according to the present embodiment further more effectively works if the content of titanium in the polymer of the polymer solution falls within the above range and a highly pure polymer solution having a smaller amount of metal residue can be obtained.

Note that, in the present embodiment, the content of residue of metals such as lithium and titanium in the polymer of the polymer solution can be determined by the methods described in Examples (described later).

In the method for producing a polymer according to the present embodiment, a case where the aluminum content in a polymer contained in the polymer solution in the step 1 is 30 ppm or more and 200 ppm or less is defined as a first embodiment; whereas a case where the aluminum content in a polymer contained in the polymer solution in step 1 is less than 30 ppm is defined as a second aspect of the present embodiment. These aspects of the present embodiment will be described below.

(First Aspect of the Present Embodiment)

In step 1, if the content of aluminum in the polymer of the polymer solution is 30 ppm or more and 200 ppm or less, the pH of the water phase of a solution mixture in step 2 (described later) is controlled to be 5.5 or less or 7 to 10.

Generally, in a hydrogenation reaction of a polymer, if an aluminum compound is used as a reducing agent in combination with a polymerization initiator and a hydrogenation catalyst, an aluminum component remains in the polymer after completion of the hydrogenation reaction. To be more specific, this is a case where a reducing agent such as an alkyl aluminum is used in combination with a titanium hydrogenation catalyst (for use in a hydrogenation reaction) such as a monocyclopentadienyltitanium compound or a bis(cyclopentadienyl) titanium compound.

The reducing agent to be used in combination with such a titanium hydrogenation catalyst is not particularly limited as long as it is an aluminum compound generally used. Examples thereof include a trialkylaluminum. As the catalyst for a hydrogenation reaction, a reducing agent is preferably used in an amount in the molar ratio range of 0.5 to 30 moles per titanium catalyst (1 mole) serving as a main catalyst i.

As the case may be, the content of aluminum in the polymer of the polymer solution may be controlled to fall within the above range by using together a metal compound except aluminum such as a lithium compound, as a reducing agent.

Usually, an aluminum residue component contained in a polymer frequently has a emulsification effect on a solution mixture such as a polymer solution-alcohol mixture or a polymer solution-water mixture. Because of this, if a liquid such as an alcohol and water incompatible with a polymer solution containing aluminum residue is added to or mixed with the polymer solution in order to remove aluminum residue, the polymer solution is often emulsified and/or insufficiently separated. If the polymer solution is emulsified and/or insufficiently separated in removing metal residue, not only production will be in trouble but also removal of metal residue will be in a difficult situation.

However, if the content of aluminum in the polymer of the polymer solution is regulated to be 30 to 200 ppm, even if water is added to the polymer solution, metal residue such as aluminum residue in the polymer can be efficiently removed without causing a problem of emulsification and/or insufficient separation.

In the method for producing a polymer according to the present embodiment, if aluminum is contained, the content of aluminum in the polymer of the polymer solution prepared in step 1 is preferably 30 to 200 pp, more preferably 30 to 150 ppm and further preferably 30 to 100 ppm. If the content of aluminum in the polymer of the polymer solution prepared in step 1 falls within the range, emulsification effect of the polymer solution caused by aluminum residue can be suppressed, and emulsification and insufficient separation tend to rarely occur. Because of this, steps 2 and 3 (described later) can be satisfactorily carried out and metal residue of a polymer solution can be efficiently removed.

Examples of the method for controlling the content of aluminum in the polymer of a polymer solution may include, but not particularly limited to, a method of previously regulating the amount of aluminum compound used as a catalyst such that the content of aluminum in the polymer of the polymer solution falls within the aforementioned range, in preparing the polymer solution; and a method of removing an aluminum component from the polymer solution by means of filtration and adsorption after completion of a hydrogenation reaction to reduce the concentration of the aluminum component up to the aforementioned value. In view of simplification of a process and production cost, the method of previously regulating the amount of aluminum compound used as a catalyst is preferably employed.

(Second Aspect of the Present Embodiment)

In step 1, if the content of aluminum in the polymer contained in the polymer solution is less than 30 ppm, the pH of the water phase of a solution mixture is controlled to be 10 or less in step 2 (described later). If the content of aluminum in the polymer of the polymer solution is regulated to be less than 30 ppm, occurrence of emulsification and insufficient separation due to the action of the aforementioned aluminum residue can be suppressed and various metal residues such as lithium residue in the polymer can be more effectively removed.

In the method for producing a polymer according to the present embodiment, the content of aluminum in the polymer of the polymer solution prepared in step 1 is preferably less than 30 ppm, more preferably less than 15 ppm and further preferably 0 ppm. If the content of aluminum in the polymer of the polymer solution prepared in step 1 falls within the range, a emulsification effect caused by aluminum residue can be suppressed and emulsification and insufficient separation tend to rarely occur. Because of this, steps 2 and 3 (described later) can be satisfactorily carried out and various metal residues such as lithium residue in the polymer solution can be more efficiently removed.

Examples of a method for preparing a polymer solution having an aluminum content of less than 30 ppm in the polymer of the polymer solution may include, but not particularly limited to, a method involving regulating the content of aluminum in the polymer of the polymer solution is less than 30 ppm by controlling the amount of the aluminum reducing agent used based on a nickel compound and a titanium compound, for example, if a hydrogenation reaction is performed. If the content of aluminum in the polymer of the polymer solution exceeds 30 ppm after a hydrogenation reaction, the content of aluminum in the polymer of the polymer solution can be regulated to be less than 30 ppm by performing a pre-treatment for removing aluminum from the polymer solution by means of filtration and adsorption. Among them, in view of simplification of a process and production cost, the method of previously controlling the amount of the aluminum reducing agent used is preferably employed.

Note that in the present embodiment, the content of aluminum in the polymer of the polymer solution can be measured by the method described in Examples (described later).

[Polymer]

Examples of a polymer to be contained in a polymer solution may include, but not particularly limited to, a polymer obtained by a lithium polymerization initiator and a hydrogenated polymer, which is obtained by subjecting the polymer to a hydrogenation reaction performed in the presence of a catalyst consisting of a titanium compound and optionally a reducing agent containing aluminum. Examples of such a polymer may include, but not particularly limited to, a conjugated diene polymer and a hydrogenated polymer thereof.

The conjugated diene polymer is not particularly limited; however, for example, a conjugated diene homopolymer having a weight average molecular weight of 500 to 1,000,000 or a random, tapered or block copolymer of a conjugated diene and a vinyl aromatic monomer can be used. In addition, polymers obtained by hydrogenating unsaturated double bonds of conjugated diene units of these can be used.

The weight average molecular weight can be obtained by gel permeation chromatography (GPC) in terms of polystyrene.

Specific examples of the conjugated diene monomer that can be used may include, but not particularly limited to, conjugated diene compounds having 4 to 12 carbon atoms such as 1,3-butadiene, isoprene, piperylene, phenylbutadiene, 3,4-dimethyl-1,3-hexadiene, and 4,5-diethyl-1,3-octadiene. Among them, 1,3-butadiene and isoprene are preferred.

Specific examples of the vinyl aromatic monomer copolymerizable with a conjugated diene monomer may include, but not particularly limited to, styrene, α-methylstyrene, styrene substituted with an alkoxy group, 2-vinylpyridine, 4-vinylpyridine, vinylnaphthalene and a vinyl allyl compound such as vinylnaphthalene substituted with an alkyl group. Among them, styrene and α-methyl styrene are preferred.

In the case where a copolymer is produced by mixing a conjugated diene monomer and a vinyl aromatic monomer, more specifically, the conjugated diene monomer and the vinyl aromatic monomer are preferably used in a weight ratio of 5:95 to 95:5. If the weight ratio falls within the range, a copolymer having excellent impact resistance and satisfactory processability tends to be obtained.

(Polymerization Reaction)

Such a conjugated diene polymer can be produced by a polymerization method known in the art. Although such a polymerization method is not particularly limited. Examples thereof include an anion polymerization method using an organic lithium compound as an initiator.

The organic lithium compound used herein is not particularly limited; specifically, e.g., n-butyllithium and s-butyllithium can be used. The amount of such an initiator used is not particularly limited as long as it is the amount generally used in the art, and can be flexibly controlled depending upon the molecular weight of a desired polymer. After a polymer solution is obtained, if the polymer solution is subjected to a hydrogenation reaction using e.g., a titanium compound and optionally a reducing agent, a hydrogenated conjugated diene polymer can be obtained.

(Hydrogenation Reaction)

Although the titanium compound to be used in a hydrogenation reaction is not particularly limited as long as it is generally used in the art. Examples thereof include a cyclopentadienyltitanium compound. Examples of the cyclopentadienyltitanium compound may include, but not particularly limited to, a cyclopentadienyltitanium halide, a cyclopentadienyl(alkoxy)titanium dihalide, a bis(cyclopentadienyl)titanium dihalide, a bis(cyclopentadienyl)titanium dialkyl compound, a bis(cyclopentadienyl)titanium diallylic compound and a bis(cyclopentadienyl)titanium dialkoxy compound. These may be used alone or in combination (two or more).

The amount of titanium compound used per conjugated diene polymer (100 g) is preferably 0.01 to 20 mmol and more preferably 0.05 to 5 mmol. If the amount of titanium compound used falls within the range, a hydrogenation reaction rate is improved and productivity becomes satisfactory. In addition, it is economically favorable that the amount of unnecessary catalyst is low, and the amount of chemical substance used for removing the catalyst after the reaction tends to be suppressed.

The reducing agent to be used in combination with the titanium compound is not particularly limited as long as it is generally used in the art. Examples thereof may include an alkylaluminum compound, an alkylmagnesium compound, an organolithium compound and a metal hydride. These may be used alone or in combination (two or more).

Examples of the hydrogenation reaction using the titanium catalyst include, but not particularly limited to, methods described in International Publication No. WO 00/08069, U.S. Pat. Nos. 4,501,857, 4,673,714, 4,980,421, 5,753,778, 5,910,566 and 6,020,439.

The hydrogenation reaction can be carried out in e.g., an inert solvent. The term "inert solvent" refers to a solvent that does not react with any reactants used in polymerization and hydrogenation reactions. Specific examples of the inert solvent may include, but not particularly limited to, aliphatic hydrocarbons such as n-pentane, n-hexane, n-heptane and n-octane; alicyclic hydrocarbons such as cyclopentane, cyclohexane and cycloheptane; and ethers such as diethyl ether and tetrahydrofuran. These may be used alone or in combination (two or more). The concentration of a conjugated diene polymer in such an inert solvent is preferably 5 to 50 mass % and more preferably 10 to 25 mass %.

The above hydrogenation reaction is preferably performed by maintaining a polymer solution at a constant temperature under an atmosphere of an inert gas such as hydrogen, helium, argon and nitrogen, adding a hydrogenation catalyst while stirring or not and injecting hydrogen gas at a constant pressure. It is preferable that the temperature of the hydrogenation reaction falls within the range of 30 to 150° C. and the pressure thereof falls within the range of 2 to 30 kg/cm$^2$.

If the temperature of the hydrogenation reaction falls within the range mentioned above, reactivity thereof is improved and a sufficient reaction yield can be obtained. In addition, a side reaction caused by heat deterioration of a polymer tends to be suppressed. If the pressure of the hydrogenation reaction falls within the range mentioned above, the rate of the reaction is improved and the reaction time tends to be reduced. In addition, it is economically favorable that cost required for a reactor can be suppressed.

The hydrogenation catalyst can be used for selectively hydrogenating only unsaturated double bonds of a conjugated diene unit of a conjugated diene polymer or a random, tapered or block copolymer formed of a conjugated diene and a vinyl aromatic monomer and having a weight average molecular weight of 500 to 1,000,000.

Now, as a method for removing metal residue from a polymer solution containing the metal residue, for example, a conjugated diene polymer solution after the aforementioned hydrogenation reaction is completed, step 2 and step 3 will be more specifically described.

[Step 2]

In the method for producing a polymer according to the present embodiment, step 2 is a step of obtaining a solution mixture by mixing the polymer solution obtained in step 1 and water in a volume ratio of 0.1 to 10 based on the polymer solution.

In step 2, the metal residue contained in the polymer solution is allowed to be in contact with water by mixing the polymer solution obtained in step 1, for example, a solution of a hydrogenated and conjugated diene polymer, and water. In this manner, a water soluble metal residue is dissolved in a water phase and removal of a water insoluble metal residue to be performed in step 3 (described later) is facilitated. In step 2, the amount of water added based on the polymer solution is 0.1 to 10 times by volume, preferably 0.2 to 5.0 times by volume and more preferably 0.5 to 2.0 times by volume. If the amount of water added in step 2 falls within the range, the metal residue contained in the polymer solution is easily removed. In addition, separation of the polymer solution and water in the solution mixture tends to be quickly completed. Furthermore, the amount of water to be discharged can be reduced.

In step 2, it is preferable that an inorganic acid is further added at the time of mixing the polymer solution and water. If the inorganic acid is added at the time of mixing the polymer solution and water, the PH of a water phase can be easily regulated and phase-separation of the polymer solution and water in the solution mixture can be quickly performed. As a result, the removal rate of metal residue can be improved.

(First Embodiment)

If the amount of aluminum residue contained in a polymer solution is 30 ppm to 200 ppm in terms of aluminum atom in the polymer, it is preferable that pH is controlled to fall within the range of 5.5 or less or 7.0 to 10.0. If the pH is 5.5 or less, the metal residue removal effectiveness tends to be more satisfactory. In contrast, if pH falls within the range of 7.0 to 10.0, since the action of remaining acid substance on the polymer is low, a polymer having more satisfactory color tone tends to be obtained. In the present embodiment, even in either one of the pH ranges, separation of a mixture of the polymer solution and water can be satisfactory completed in a short time. Among the aforementioned pH ranges, a pH range of 7.0 to 9.0 is more preferable and pH range of 7.0 to 8.5 is further preferable. Controlling pH to fall within such a range is particularly preferable in view of metal residue removal effectiveness and balance of the removal effectiveness with color tone.

If the pH of the water phase of a solution mixture is 5.5 or less or 7.0 or more, emulsification of the polymer solution with the water phase and insufficient separation thereof tend to rarely occur.

(Second Embodiment)

In contrast, if the amount of aluminum residue contained in the polymer solution is less than 30 ppm in terms of aluminum atom in the polymer or completely 0, it is preferable that the pH of the water phase of the solution mixture is controlled to be 10 or less, more preferably 9.5 or less, further preferably 9.0 or less and further more preferably 8.5 or less. The lower limit value of the pH of the water phase of the solution mixture is preferably 5 or more and more preferably 6.5 or more. The pH of the water phase of the solution mixture is preferably controlled to be 5.0 to 8.5, more preferably, 6.0 to 8.5, further preferably 6.5 to 8.5 and further more preferably 7.0 to 8.5. If the pH of the water phase of the solution mixture falls within the above range, the metal residue removal effectiveness in the polymer becomes satisfactory and the polymer solution and water mixed can be satisfactorily separated in a short time.

In either one of the first embodiment and second embodiment, the pH of the water phase of the solution mixture is preferably controlled to be 7 to 8.5 regardless of the amount of aluminum residue, more preferably 7.2 to 8.3 and further preferably 7.5 to 8.2. If the pH falls within the above range, the polymer solution and the water phase can be separated in a short time. In addition, a water soluble metal residue contained in the polymer can be effectively extracted in the water phase and further a water insoluble metal residue can be easily removed in step 3 (described later). Thus, the above pH range is preferable.

When a polymer solution and water are mixed to obtain a solution mixture, the pH of the water phase of the solution mixture increases usually, by the action of metal residue (e.g., alkaline lithium residue) present in the polymer solution and a polymerization additive such as an amine compound. The degree of the increase greatly varies depending upon the amount of metal residue, the amount of polymerization additive, and pH and amount of water before mixing. When an aqueous solution of inorganic acid (pH 3.0) is added in a volume ratio of 2 to the polymer solution, the pH of the water phase obtained after mixing with the polymer solution often falls within the range of 4.0 to 12.0. If the pH of the water phase of the solution mixture is regulated to fall within the range of 5.5 or less, or 7.0 to 10.0, even if the polymer contains 30 to 200 ppm of aluminum residue, phase separation between the polymer solution and water rapidly occurs in a short time without causing emulsification and insufficient separation. As a result, an operation of separating both phases thereafter can be extremely easily performed and productivity is drastically improved and further residue of a metal such as aluminum can be effectively removed from the polymer solution.

Examples of a method of adding an acid may include, but not particularly limited to, a method of mixing an acidic water previously prepared to a polymer solution and a method of mixing a polymer solution and water, followed by adding an acid, and stirring them. Among these methods, in view of simplification of the process, a method of adding acidic water to a polymer solution is preferred. The acid is not particularly limited as long as it is an inorganic acid generally used in the art. Among them, examples of the inorganic acid include at least one inorganic acid selected from the group consisting of hydrochloric acid, sulfuric acid, nitric acid and phosphoric acid. Using such an inorganic acid is preferable since it is excellent in reducing environment pollution caused by discharge water.

(Alcohol)

In the method for producing a polymer according to the present embodiment, an additive such as a compatibility accelerator such as alcohol may be used in order to enhance miscibility of a polymer solution and a water phase. However, even if such an additive is not be used, a high metal removal effectiveness can be obtained. The compatibility accelerator is not particularly limited. Examples thereof include an alcohol. However, use of a compatibility accelerator such as alcohol has a risk of causing insufficient separation between a polymer solution and a water phase and further has a problem of increasing load of waste water to be treated. Because of this, the concentration of alcohol in mixing a polymer solution and water is preferably 5% or less, more preferably 1% or less and further preferably 500 ppm or less. If the alcohol concentration at the time of mixing, falls within the above range, time for separating the polymer solution and the water phase in the solution mixture can be reduced. In addition, the content of water in the polymer solution can be reduced and the amount of metal residue in the polymer solution can be reduced. Thus, the above alcohol concentration range is preferable. The concentration of alcohol in the polymer can be obtained by gas chromatography.

Furthermore, using no alcohol is also preferable. If an alcohol is not used in a metal removal process, the polymer solution and water is more satisfactorily separated and waste water is more easily treated.

In step 2, a method for mixing the polymer solution and water is not particularly limited as long as the catalyst residue of the polymer solution can be effectively brought into contact with water and any method such as a mixing method by rotating a stirring vane in an in-line mixer or a tank generally used can be applied. If the polymer solution and water are mixed by using an apparatus applicable of a strong stirring force, metal residue can be effectively removed in a short time. Even if an apparatus applicable of a small stirring force, the equivalent metal removal effectiveness can be attained if mixing time is extended.

In step 2, mixing of the polymer solution and water is preferably performed in the following conditions.

[Mixing Condition]

$$(P/V) \cdot T_1 \geq 100$$

wherein P represents power (kw), V represents volume (m$^3$) and $T_1$ represents mixing time (sec).

The $(P/V) \cdot T$ value is preferably 100 or more, more preferably 1000 or more and further preferably 3000 or more. The upper limit of the $(P/V) \cdot T$ value is not particularly limited; for example, 1000000 or less, preferably 100000 or less and more preferably 30000 or less. If the polymer solution and water are mixed by using, for example, a rotatory dispersion machine having an engaging structure as described in Japanese Patent Laid-Open No. 6-136034, under high shearing ($P/V=3\times10^4$), metal residue can be efficiently removed in a very short time of 0.01 to 1 second. Thus, using such a rotatory dispersion machine is preferable.

Reference symbol P (kw) used herein represents a mixing power and easily obtained by measuring power consumption during mixing. Reference symbol V (m$^3$) represents a spatial volume of a mixing portion, in other words, the spatial volume in which shearing force is applied to a solution. Reference symbol $T_1$ (sec) represents time for mixing a polymer solution. In a mixer of a continuous system, $T_1$ (sec) represents the time where a solution passes through a mixer portion, whereas, in a mixer of a batch system, $T_1$ (sec) represents retention time of the solution in a mixer.

[Step 3]

The method for producing a polymer according to the present embodiment is preferably has, after step 2, at least step 3 of applying centrifugal acceleration to a polymer solution, for example, the solution mixture obtained in step 2. It is generally known well that two phases are separated by a method of applying centrifugal acceleration downstream of a mixing step of a polymer solution, water and alcohol. However, in the method for producing a polymer according to the present embodiment, step 3 is not only directed to simply separating two phases. When a polymer solution and water are mixed in step 2, a water soluble component of metal residue present in a polymer is extracted in a water phase, whereas a water insoluble component remains in the polymer. Step 3 is carried out for the purpose of sufficiently removing water remaining in a small amount in the polymer solution by applying centrifugal acceleration, thereby completely removing a water soluble metal residue component from the polymer; and also for the purpose of removing a solid-state metal residue remaining in the polymer solution by application of centrifugal acceleration. Such purposes significantly differ in idea from the conventional purposes for applying centrifugal acceleration.

The polymer solution prepared in step 1 is mixed with water in step 2. After step 2, step 3 of applying centrifugal acceleration to the polymer solution is carried out. In this manner, the amount of water contained in the polymer solution after separation of phase can be reduced; metal residue contained in the polymer of the polymer solution can be more effectively removed; and the polymer can be simply and efficiently obtained from the polymer solution. This process is also preferable in view of energy efficiency. In step 3, centrifugal acceleration is preferably applied in the following conditions.

[Centrifugation Condition]

$$0.01 \leq (G \cdot T_2) \leq 5000$$

wherein G represents a relative centrifugal acceleration rate and T2 represents centrifugation time (hr).

In step 3, when centrifugal acceleration is applied, conditions such as an acceleration rate are not particularly limited; however, the G·T$_2$ value preferably falls within the range of 0.01 to 5000, more preferably 0.1 to 1000 and further preferably 1 to 500. Reference symbol G used herein represents a relative centrifugal acceleration rate, T$_2$ represent time (hr) for applying centrifugal acceleration.

A means for applying centrifugal acceleration is not particularly limited as long as it is generally used in the art; however, since a water phase and metal residue are simultaneously removed from the polymer solution, a centrifugal machine is preferable. Among the centrifugal machines, a disk-type centrifugal machine is preferable since a settling area is large and a high separation effect can be expected.

[Step A]

As mentioned above, in the method for producing a polymer according to the present embodiment, when the polymer solution prepared in step 1 is mixed with water in accordance with the manner of step 2, occurrence of emulsification and insufficient separation can be suppressed and the polymer solution and water can be quickly separated into two phases after completion of mixing in step 2. Then, it is preferable that step A of separating and removing water form a solution mixture of the polymer solution and water obtained in step 2 is further included between step 2 and step 3. If the water phase separated is removed before step 3 is started, the water phase, which is basically unnecessary to be treated with centrifugal acceleration, can be eliminated. Also in step 3, the time for applying centrifugal acceleration to the polymer solution can be extended. As a result, the metal residue contained in the polymer of the polymer solution can be further reduced. The method for separating and removing water from a solution mixture of a polymer solution and water is not particularly limited. Examples thereof include settled separation using a tank and decanter separation.

[Polymer Solution]

The polymer solution of the present embodiment is a polymer solution purified by the aforementioned method for producing a polymer. Since the polymer solution of the present embodiment is purified by the aforementioned method for producing a polymer, a highly purified polymer solution with a smaller amount of metal residue is obtained.

[Polymer]

The polymer of the present embodiment is contained in the aforementioned polymer solution and obtained from the polymer solution. The polymer of the present embodiment can be obtained, for example, by drying the aforementioned polymer solution. Examples of the method for drying the polymer solution include drying under vacuum. The polymer of the present embodiment, which is obtained from the aforementioned polymer solution, has a smaller amount of metal residue, and excellent color tone, particularly color tone after heating, as well as excellent transparency.

EXAMPLES

Hereinafter, the present invention will be described based on Examples; however, the present invention is not limited to these.

<Method for Determining Structure of Polymer Obtained in Production Example and Method for Measuring Physical Properties>

(1) Determination of Styrene Content in Polymer

The styrene content was determined by using a chloroform solution of each of the polymers obtained in Production Examples by means of a UV spectrophotometer (UV-2450) manufactured by Shimadzu Corporation.

(2) Determination of Weight Average Molecular Weight of Polymer

The molecular weight (polystyrene equivalent) of a polymer was determined by using a THF solution of each of the polymers obtained in Production Examples by means of GPC (HLC-8220, manufactured by TOSOH CORPORATION).

(3) Determination of Hydrogenation Rate

The polymer solutions obtained in Production Examples were dried under vacuum. The polymers thus obtained were subjected to NMR (apparatus name: JNM-ECS400, manufactured by JEOL) measurement to obtain a hydrogenation rate of double bonds thereof.

(4) Measurement of Amount of Metal Contained in the Polymer Obtained in Production Example The polymer solutions obtained in Production Examples were dried under vacuum to obtain polymers. The amount of metal residue contained in the polymers was measured by element analysis using an inductively coupled plasma (apparatus name: ICPS-7510, manufactured by Shimadzu Corporation).

Production Example 1

The polymer solution of Production Example 1 containing 12.5 mass % of a polystyrene-polybutadiene-polystyrene block copolymer (styrene content: 30.0 mass %, butadiene content: 70.0 mass %, weight average molecular weight: 50,000) was prepared using n-Butyl lithium as a polymerization initiator in a cyclohexane in accordance with a sequential living anion polymerization method known in the art. At this time, ethanol was added as a polymerization inactivator in an equal amount to living lithium. The obtained polymer solution was dried under vacuum to obtain a polymer. The amount of metal residue contained in the polymer was measured. The measurement results are shown in Table 1.

Production Example 2

The polymer solution prepared in Production Example 1 was placed in an autoclave reactor and heated to 60° C. while stirring at 400 rpm. The polymer solution heated, lithium hydride (1.0 mmol) and bis(cyclopentadienyl)titanium dichloride (0.8 mmol) were added and pressurized by hydrogen at 10 kg/cm$^2$ to carry out a hydrogenation reaction. As a result, the polymer solution of Production Example 2 containing a hydrogenated polymer was obtained. The polymer solution was dried under vacuum. The resultant polymer had a hydrogenation ratio of 98% or more. The amount of metal residue contained in the obtained polymer was measured. The measurement results are shown in Table 1.

Production Example 3

The polymer solution prepared in Production Example 1 was placed in an autoclave reactor and heated to 60° C. while stirring at 400 rpm. The polymer solution heated, trimethylaluminum (0.1 mmol) and bis(cyclopentadienyl) titanium dichloride (0.8 mmol) were added and pressurized by hydrogen at 10 kg/cm$^2$ to carry out a hydrogenation reaction. As a result, the polymer solution of Production Example 3 containing a hydrogenated polymer was obtained. The polymer solution was dried under vacuum. The resultant polymer had a hydrogenation ratio of 98% or more. The amount of metal residue contained in the obtained polymer was measured. The measurement results are shown in Table 1.

Production Example 4

A cyclohexane solution (2800 g) containing the polymer (400 g) obtained by drying the polymer solution of Production Example 1 under vacuum was placed in a 5-L autoclave reactor and heated to 60° C. while stirring at 400 rpm to obtain a polymer solution. Thereafter, triethylaluminum and bis(cyclopentadienyl)titanium dichloride were added to the polymer solution respectively such that the amount ratio of titanium based on the polymer was 100 ppm and the amount ratio of aluminum based on the polymer was 100 ppm, pressurized by hydrogen at 10 kg/cm$^2$ to carry out a hydrogenation reaction. As a result, a polymer solution of Production Example 4 containing a hydrogenated polymer was obtained. The concentration of the polymer in the obtained polymer solution was 12.5 mass %. The polymer solution was dried under vacuum. The resultant polymer had a hydrogenation ratio of 98% or more. The amount of metal residue contained in the obtained polymer was measured. The measurement results are shown in Table 1.

Production Example 5

The polymer solution of Production Example 5 was obtained in the same manner as in Production Example 4 except that triethylaluminum was added to the polymer solution such that the ratio of the amount of aluminum based on that of the polymer was 30 ppm. The concentration of a polymer in the obtained polymer solution was 12.5 mass %. The polymer solution was dried under vacuum. The resultant polymer had a hydrogenation ratio of 98% or more. The amount of metal residue contained in the obtained polymer was measured. The measurement results are shown in Table 1.

Production Example 6

The polymer solution of Production Example 6 was obtained in the same manner as in Production Example 4 except that triethylaluminum was added to the polymer solution such that the ratio of the amount of aluminum based on that of the polymer was 200 ppm. The concentration of a polymer in the obtained polymer solution was 12.5 mass %. The polymer solution was dried under vacuum. The resultant polymer had a hydrogenation ratio of 98% or more. The amount of metal residue contained in the obtained polymer was measured. The measurement results are shown in Table 1.

Production Example 7

A cyclohexane solution (2800 g) containing the polymer (400 g) obtained by drying the polymer solution of Production Example 1 under vacuum was placed in a 5-L autoclave reactor and heated to 60° C. while stirring at 400 rpm to obtain a polymer solution. Thereafter, nickel 2-ethylhexanoate and a triethylaluminum catalyst were added to the polymer solution respectively such that the amount ratio of nickel based on the polymer was 100 ppm, and such that the amount ratio of aluminum based on the polymer was 100 ppm, and a hydrogenation reaction was performed at a hydrogen pressure of 700 psig for 60 minutes. After that, the polymer solution was raised in temperature up to 90° C. and maintained at the temperature for further 25 minutes to carry out a hydrogenation reaction. As a result, a polymer solution of Production Example 7 containing a hydrogenated polymer was obtained. The concentration of the polymer in the obtained polymer solution was 12.5 mass %. The polymer solution was dried under vacuum. The resultant polymer had a hydrogenation ratio of 98% or more. The amount of metal residue contained in the obtained polymer was measured. The measurement results are shown in Table 1.

Production Example 8

The polymer solution of Production Example 8 was obtained in the same manner as in Production Example 7 except that triethylaluminum was added to the polymer solution such that the ratio of the amount of aluminum based on that of the polymer was 30 ppm. The concentration of a polymer in the obtained polymer solution was 12.5 mass %. The polymer solution was dried under vacuum. The resultant polymer had a hydrogenation ratio of 98% or more. The amount of metal residue contained in the obtained polymer was measured. The measurement results are shown in Table 1.

Production Example 9

The polymer solution of Production Example 9 was obtained in the same manner as in Production Example 7 except that triethylaluminum was added to the polymer solution such that the ratio of the amount of aluminum based on that of the polymer was 200 ppm. The concentration of a polymer in the obtained polymer solution was 12.5 mass %. The polymer solution was dried under vacuum. The resultant polymer had a hydrogenation ratio of 98% or more. The amount of metal residue contained in the obtained polymer was measured. The measurement results are shown in Table 1.

TABLE 1

| | Amount of metal residue in polymer (ppm) | | | |
|---|---|---|---|---|
| | Li | Ti | Ni | Al |
| Production Example 1 | 100 | 0 | 0 | 0 |
| Production Example 2 | 120 | 100 | 0 | 0 |
| Production Example 3 | 100 | 100 | 0 | 20 |
| Production Example 4 | 100 | 100 | 0 | 100 |
| Production Example 5 | 100 | 100 | 0 | 30 |
| Production Example 6 | 100 | 100 | 0 | 200 |
| Production Example 7 | 100 | 0 | 100 | 100 |
| Production Example 8 | 100 | 0 | 100 | 30 |
| Production Example 9 | 100 | 0 | 100 | 200 |

<Method for Determining Structure of Polymer Obtained in Example and Comparative Example and Method for Determining Physical Properties>
(5) Measurement for Metal Residue Contained in Polymer Obtained in Example and Comparative Example The amount of metal residue contained in each of polymers obtained in Examples and Comparative Examples (described later) was measured by element analysis using an inductively coupled plasma (apparatus name: ICPS-7510, manufactured by Shimadzu Corporation).

(6) Color Tone

The polymer obtained in each of Examples and Comparative Examples (described later) was subjected to compression molding to make a sheet having a thickness of 2 mm. The b value of the obtained sheet was measured by a colorimeter (ZE-2000, manufactured by NIPPON DENSHOKU INDUSTRIES Co., LTD.). The larger the b value, the stronger the yellowish color of the polymer and the inferior the color tone. Based on this, evaluation was made.

[Evaluation Criteria]

AAA: b value was less than 1
AA: b value was 1 or more and less than 3
A: b value was 3 or more and less than 5
B: b value was 5 or more and less than 10
C: b value was 10 or more (7) Color Tone after Heating The polymer obtained in each of Examples and Comparative Examples (described later) was subjected to compression molding to make a sheet having a thickness of 2 mm. The obtained sheet was placed in a gear oven and heated at 200° C. for 30 minutes. Thereafter, the b value of the sheet was measured by a colorimeter (ZE-2000, manufactured by NIPPON DENSHOKU INDUSTRIES Co., LTD.). The larger the b value, the stronger the yellowish color of the polymer and the inferior the color tone after heating. Based on this, evaluation was made.

[Evaluation Criteria]

AAA: b value was less than 3
AA: b value was 3 or more and less than 6
A: b value was 6 or more and less than 10
B: b value was 10 or more and less than 15
C: b value was 15 or more (8) Transparency The polymer obtained in each of Examples and Comparative Examples (described later) was subjected to compression molding to make a sheet having a thickness of 2 mm. The obtained sheet was placed in liquid paraffin and haze value (cloudiness) was measured by a haze meter (NDH-1001DP, manufactured by NIPPON DENSHOKU INDUSTRIES Co., LTD.). The haze value was used as an index for transparency. The smaller the haze value, the more transparent the polymer. Based on this, evaluation was made.

[Evaluation Criteria]

AAA: haze value was less than 5%
AA: haze value was 5% or more and less than 10%
A: haze value was 10% or more and less than 15%
B: haze value was 15% or more and less than 20%
C: haze value was 20% or more (9) Water Content After a polymer was produced in each of Examples and Comparative Examples (described later), the content of water contained in the polymer solution was measured by Karl Fischer's moisture meter (MKA-610, manufactured by KYOTO ELECTRONICS MANUFACTURING CO., LTD.).

[Criteria]

AAA: water content was less than 0.5 mass %
AA: water content was 0.5 mass % or more and less than 1.0 mass %
A: water content was 1.0 mass % or more and less than 3.0 mass %
B: water content was 3.0 mass % or more and less than 5.0 mass %
C: water content was 5.0 mass % or more

(10) Filter Clogging

After a polymer was produced in each of Examples and Comparative Examples (described later), a polymer solution (500 mL) was filtered by a membrane filter (5 μm (40φ) manufactured by ADVANTEC, and then filterability (filter clogging, reduction in filtration rate, etc.) was evaluated.

[Evaluation Criteria]

AAA: filtration was smoothly carried out without filter clogging and reduction in filtration rate
AA: filtration was carried out almost without filter clogging
A: filtration was carried out although filtration rate reduced
B: filtration was carried out to the end although filtration rate was low
C: It was difficult to carry filtration due to significant filter clogging

(11) Alcohol Concentration

To the solution mixture in step 2, excessive acetone was added to precipitate a solid-state polymer. Thereafter the concentration of alcohol in a liquid phase was analyzed by gas chromatography (apparatus name: GC-2014, column: Chromosorb-W AW-DMCS 60/80 mesh, manufactured by Shimadzu Corporation). Furthermore, it was confirmed that alcohol did not remain in the solid-state polymer by the NMR method. Based on alcohol concentration measured by the gas chromatography and the amount of acetone added, the alcohol concentration of the solution mixture of step 2 was calculated.

Example 1

The polymer solution obtained in Production Example 2 and the same volume of water as that of the polymer solution were mixed in an in-line mixer (having no driving portion) at 60° C. for 20 minutes to obtain a solution mixture. The solution mixture thus obtained was fed to a tank heated at 60° C. and allowed to stand still to separate a polymer solution phase and a water phase. The pH of the water phase separated was 9.5 and the separation state was satisfactory.

The water phase was removed from the mixture to obtain a polymer solution. The polymer solution thus obtained was dried under vacuum to obtain a solid-state polymer. The polymer solution and solid-state polymer thus obtained were subjected to the measurements as mentioned above. The measurement results are shown in Table 2-1.

Examples 2 to 5

Each of the polymer solutions was obtained in the same manner as in Example 1 except that sulfuric acid was added at the time of mixing the polymer solution obtained in Production Example 2 and water to control pH of the solution mixture as shown in Table 2-1. The obtained polymer solution was dried under vacuum to obtain a solid-state polymer. The polymer solution and solid-state polymer thus obtained were subjected to the measurements as mentioned above. The measurement results are shown in Table 2-1.

Examples 6 to 8

Each of the polymer solutions was obtained in the same manner as in Example 2 except that the mixing ratio of the polymer solution obtained in Production Example 2 and water was changed as shown in Table 2-1. The obtained polymer solution was dried under vacuum to obtain a solid-state polymer. The polymer solution and solid-state polymer thus obtained were subjected to the measurements as mentioned above. The measurement results are shown in Table 2-1.

Example 9

The polymer solution obtained in Production Example 2 and an equivalent volume of water to that of the polymer solution were mixed in a rotatory dispersion machine (Cavitron 1010, volume V of mixing portion: $4 \times 10^{-6}$ m$^3$, manufactured by EUROTEC. CO., LTD.) having an engaging structure at 60° C. at a power P of 1 kw for $6 \times 10^{-4}$ seconds to obtain a solution mixture. At the time, the (P/V)·T1 value was 150. Note that sulfuric acid was added at the time of mixing the polymer solution obtained in Production Example 2 and water to control pH of the solution mixture to be 8.0.

The solution mixture thus obtained was fed to a tank heated at 60° C. and allowed to stand still to separate a polymer solution phase and a water phase. The water phase was removed from the mixture to obtain a polymer solution. The polymer solution thus obtained was dried under vacuum to obtain a solid-state polymer. The polymer solution and solid-state polymer thus obtained were subjected to the measurements as mentioned above. The measurement results are shown in Table 2-1.

Examples 10 to 12

Each of the polymer solutions was obtained in the same manner as in Example 9 except that the (P/V)·T1 value of the mixing condition was changed to the value shown in Table 2-1. The polymer solution thus obtained was dried under vacuum to obtain a solid-state polymer. The polymer solution and solid-state polymer thus obtained were subjected to the measurements as mentioned above. The measurement results are shown in Table 2-1.

Example 13

The polymer solution obtained in Production Example 2 and an equivalent volume of water to that of the polymer solution were mixed in a rotatory dispersion machine (Cavitron 1010, power P of 1 kw, volume V of mixing portion: $4 \times 10^{-6}$ m$^3$, manufactured by EUROTEC. CO., LTD.) having an engaging structure at 60° C. for 0.1 second to obtain a solution mixture. At the time, the (P/V)·T1 value was 25000. Note that sulfuric acid was added at the time of mixing the polymer solution obtained in Production Example 2 and water to control pH of the solution mixture to be 8.0.

To the obtained solution mixture, centrifugal acceleration was applied by a centrifugal machine (disk-type centrifugal machine, relative centrifugal acceleration rate: 5000 G, manufactured by Alfalaval) for 0.02 hours. At this time, the centrifugation condition (G·T2 value) was 100.

The solution mixture centrifuged was fed to a tank heated at 60° C. and allowed to stand still to separate a polymer solution phase and a water phase. The state of separation was satisfactory. The water phase was removed from the mixture to obtain a polymer solution. The polymer solution thus obtained was dried under vacuum to obtain a solid-state polymer. The polymer solution and solid-state polymer thus obtained were subjected to the measurements as mentioned above. The measurement results are shown in Table 2-1.

Examples 14 to 16

Each of the polymer solutions was obtained in the same manner as in Example 13 except that the G·T2 value of the centrifugation condition was changed to the value shown in Table 2-1. The polymer solution thus obtained was dried under vacuum to obtain a solid-state polymer. The polymer solution and solid-state polymer thus obtained were subjected to the measurements as mentioned above. The measurement results are shown in Table 2-1.

Example 17

The polymer solution obtained in Production Example 2 and an equivalent volume of water to that of the polymer solution were mixed in a rotatory dispersion machine (Cavitron 1010, power P of 1 kw, volume V of mixing portion: $4 \times 10^{-6}$ m$^3$, manufactured by EUROTEC. CO., LTD.) having an engaging structure at 60° C. for 0.1 second to obtain a solution mixture. At the time, the (P/V)·T1 value was 25000. Note that sulfuric acid was added at the time of mixing the polymer solution obtained in Production Example 2 and water to control pH of the solution mixture to be 8.0.

Subsequently, the water phase was separated and removed from the solution mixture by decanting to obtain the polymer solution. Note that the state of separation was satisfactory. To the obtained polymer solution, centrifugal acceleration was applied by a centrifugal machine (disk-type centrifugal machine, relative centrifugal acceleration rate: 5000 G, manufactured by Alfalaval) for 0.04 hours. At this time, the centrifugation condition (G·T2 value) was 200.

The polymer solution thus centrifuged was dried under vacuum to obtain a solid-state polymer. The polymer solution and solid-state polymer thus obtained were subjected to the measurements as mentioned above. The measurement results are shown in Table 2-1.

Examples 18 to 20

Each of the polymer solutions was obtained in the same manner as in Example 17 except that the G·T2 value of the centrifugation condition was changed to the value shown in Table 2-1. The polymer solution thus obtained was dried under vacuum to obtain a solid-state polymer. The polymer solution and solid-state polymer thus obtained were subjected to the measurements as mentioned above. The measurement results are shown in Table 2-1.

Examples 21 and 22

Each of the polymer solutions was obtained in the same manner as in Example 19 except that the amount of sulfuric acid added at the time of mixing the polymer solution obtained in Production Example 2 and water was changed to control pH of the solution mixture to be the value shown in Table 2-1. The polymer solution thus obtained was dried under vacuum to obtain a solid-state polymer. The polymer solution and solid-state polymer thus obtained were subjected to the measurements as mentioned above. The measurement results are shown in Table 2-1.

Example 23

The polymer solution obtained in Production Example 3 and an equivalent volume of water to that of the polymer solution were mixed in a rotatory dispersion machine (Cavitron 1010, volume V of mixing portion: $4 \times 10^{-6}$ m$^3$, manufactured by EUROTEC. CO., LTD.) having an engaging structure at 60° C. at a power P of 1 kw for 0.1 second to obtain a solution mixture. At the time, the (P/V)·T1 value was 25000.

The solution mixture obtained was fed to a tank heated at 60° C. and allowed to stand still to separate a polymer solution phase and a water phase. The pH of the water phase separated was 9.5 and the separation state was satisfactory.

The water phase was removed from the mixture to obtain the polymer solution. The polymer solution thus obtained was dried under vacuum to obtain a solid-state polymer. The polymer solution and solid-state polymer thus obtained were subjected to the measurements as mentioned above. The measurement results are shown in Table 2-2.

Examples 24 to 27

Each of the polymer solutions was obtained in the same manner as in Example 23 except that sulfuric acid was added at the time of mixing the polymer solution obtained in Production Example 3 and water to control pH of the solution mixture to be the value shown in Table 2-2. The polymer solution thus obtained was dried under vacuum to obtain a solid-state polymer. The polymer solution and solid-state polymer thus obtained were subjected to the measurements as mentioned above. The measurement results are shown in Table 2-2.

Examples 28

The polymer solution obtained in Production Example 3 and an equivalent volume of water to that of the polymer solution were mixed in a rotatory dispersion machine (Cavitron 1010, power P of 1 kw, volume V of mixing portion: $4 \times 10^{-6}$ m$^3$, manufactured by EUROTEC. CO., LTD.) having an engaging structure at 60° C. for 0.1 second to obtain a solution mixture. At the time, the (P/V)·T1 value was 25000.

Subsequently, the water phase was separated and removed from the solution mixture by decanting to obtain the polymer solution. The pH of the water phase separated was 9.5 and the separation state was satisfactory. To the obtained solution mixture, centrifugal acceleration was applied by a centrifugal machine (disk-type centrifugal machine, relative centrifugal acceleration rate: 20000 G, manufactured by Alfalaval) for 0.2 hours. At this time, the centrifugation condition (G·T2 value) was 4000.

The polymer solution centrifuged was dried under vacuum to obtain a solid-state polymer. The polymer solution and solid-state polymer thus obtained were subjected to the measurements as mentioned above. The measurement results are shown in Table 2-2.

Examples 29 to 32

Each of the polymer solutions was obtained in the same manner as in Example 28 except that sulfuric acid was added at the time of mixing the polymer solution obtained in Production Example 3 and water to control pH of the solution mixture to be the value shown in Table 2-2. The polymer solution thus obtained was dried under vacuum to obtain a solid-state polymer. The polymer solution and solid-state polymer thus obtained were subjected to the measurements as mentioned above. The measurement results are shown in Table 2-2.

Example 33

The polymer solution obtained in Production Example 1 and an equivalent volume of water to that of the polymer solution were mixed in a rotatory dispersion machine (Cavitron 1010, volume V of mixing portion: $4 \times 10^{-6}$ m$^3$, manufactured by EUROTEC. CO., LTD.) having an engaging structure at 60° C. at a power P of 1 kw for 0.1 second to obtain a solution mixture. At the time, the (P/V)·T1 value was 25000.

The solution mixture obtained was fed to a tank heated at 60° C. and allowed to stand still to separate a polymer solution phase and a water phase. The pH of the water phase separated was 9.5 and the separation state was satisfactory.

The water phase was removed from the mixture to obtain the polymer solution. The polymer solution thus obtained was dried under vacuum to obtain a solid-state polymer. The polymer solution and solid-state polymer thus obtained were subjected to the measurements as mentioned above. The measurement results are shown in Table 2-3.

Examples 34 to 37

Each of the polymer solutions was obtained in the same manner as in Example 33 except that sulfuric acid was added at the time of mixing the polymer solution obtained in Production Example 1 and water to control pH of the solution mixture to be the value shown in Table 2-3. The polymer solution thus obtained was dried under vacuum to obtain a solid-state polymer. The polymer solution and solid-state polymer thus obtained were subjected to the measurements as mentioned above. The measurement results are shown in Table 2-3.

Examples 38

The polymer solution obtained in Production Example 1 and an equivalent volume of water to that of the polymer solution were mixed in a rotatory dispersion machine (Cavitron 1010, power P of 1 kw, volume V of mixing portion: $6 \times 10^{-6}$ m$^3$, manufactured by EUROTEC. CO., LTD.) having an engaging structure at 60° C. for 0.1 second to obtain a solution mixture. At the time, the (P/V)·T1 value was 25000.

Subsequently, the water phase was separated and removed from the solution mixture by decanting to obtain the polymer solution. The pH of the water phase separated was 9.5 and the separation state was satisfactory.

To the obtained solution mixture, centrifugal acceleration was applied by a centrifugal machine (disk-type centrifugal machine, relative centrifugal acceleration rate: 20000 G, manufactured by Alfalaval) for 0.25 hours. At this time, the centrifugation condition (G·T2 value) was 5000.

The polymer solution centrifuged was dried under vacuum to obtain a solid-state polymer. The polymer solution and solid-state polymer thus obtained were subjected to the measurements as mentioned above. The measurement results are shown in Table 2-3.

Examples 39 to 42

Each of the polymer solutions was obtained in the same manner as in Example 38 except that sulfuric acid was added at the time of mixing the polymer solution obtained in Production Example 3 and water to control pH of the solution mixture to be the value shown in Table 2-3. The polymer solution thus obtained was dried under vacuum to obtain a solid-state polymer. The polymer solution and solid-state polymer thus obtained were subjected to the measurements as mentioned above. The measurement results are shown in Table 2-3.

Comparative Example 1

A polymer solution was obtained in the same manner as in Example 1 except that sodium hydroxide was added at the time of mixing the polymer solution obtained in Production Example 2 and water to control pH of the water phase to be 11. The polymer solution thus obtained was dried under vacuum to obtain a solid-state polymer. The polymer solution and solid-state polymer thus obtained were subjected to the measurements as mentioned above. The measurement results are shown in Table 2-3.

Comparative Example 2

A polymer solution was obtained in the same manner as in Example 2 except that the mixing ratio of the polymer solution obtained in Production Example 2 and water (water/polymer solution (volume ratio)) was changed to 0.05. The polymer solution thus obtained was dried under vacuum to obtain a solid-state polymer. The polymer solution and solid-state polymer thus obtained were subjected to the measurements as mentioned above. The measurement results are shown in Table 2-3.

Comparative Example 3

A polymer solution was obtained in the same manner as in Example 3 except that the mixing ratio of the polymer solution obtained in Production Example 2 and water (water/polymer solution (volume ratio)) was changed to 15.0. The polymer solution thus obtained was dried under vacuum to obtain a solid-state polymer. The polymer solution and solid-state polymer thus obtained were subjected to the measurements as mentioned above. The measurement results are shown in Table 2-3.

Comparative Example 4

A polymer solution was obtained in the same manner as in Example 38 except that the polymer solution obtained in Production Example 2 was used in place of the polymer solution obtained in Production Example 1, and that sodium hydroxide was added at the time of mixing the polymer solution obtained in Production Example 2 and water to control pH of the water phase to be 11. The polymer solution thus obtained was dried under vacuum to obtain a solid-state polymer. The polymer solution and solid-state polymer thus obtained were subjected to the measurements as mentioned above. The measurement results are shown in Table 2-3.

Comparative Example 5

A polymer solution was obtained in the same manner as in Example 39 except that the polymer solution obtained in Production Example 2 was used in place of the polymer solution obtained in Production Example 1, and that the mixing ratio of the polymer solution obtained in Production Example 2 and water (water/polymer solution (volume ratio)) was changed to 0.05. The polymer solution thus obtained was dried under vacuum to obtain a solid-state polymer. The polymer solution and solid-state polymer thus obtained were subjected to the measurements as mentioned above. The measurement results are shown in Table 2-3.

Comparative Example 6

A polymer solution was obtained in the same manner as in Example 40 except that the polymer solution obtained in Production Example 2 was used in place of the polymer solution obtained in Production Example 1, and that the mixing ratio of the polymer solution obtained in Production Example 2 and water (water/polymer solution (volume ratio)) was changed to 15.0. The polymer solution thus obtained was dried under vacuum to obtain a solid-state polymer. The polymer solution and solid-state polymer thus obtained were subjected to the measurements as mentioned above. The measurement results are shown in Table 2-3.

Example 43

The polymer solution obtained in Production Example 4 and an equivalent volume of water to that of the polymer solution were mixed in an in-line mixer (having no driving portion) at 60° C. for 20 minutes to obtain a solution mixture. The solution mixture thus obtained was fed to a tank heated at 60° C. and allowed to stand still to separate a polymer solution phase and a water phase. The pH of the water phase separated was 9.5 and the separation state was satisfactory.

The water phase was removed from the mixture to obtain the polymer solution. The polymer solution thus obtained was dried under vacuum to obtain a solid-state polymer. The polymer solution and solid-state polymer thus obtained were subjected to the measurements as mentioned above. The measurement results are shown in Table 2-4.

Examples 44 to 46

Each of the polymer solutions was obtained in the same manner as in Example 43 except that sulfuric acid was added at the time of mixing the polymer solution obtained in Production Example 4 and water to control pH of the solution mixture as shown in Table 2-4. The polymer solution thus obtained was dried under vacuum to obtain a solid-state polymer. The polymer solution and solid-state polymer thus obtained were subjected to the measurements as mentioned above. The measurement results are shown in Table 2-4.

Examples 47 to 49

Each of the polymer solutions was obtained in the same manner as in Example 44 except that the mixing ratio of the polymer solution obtained in Production Example 4 and water was changed as shown in Table 2-4. The polymer solution thus obtained was dried under vacuum to obtain a solid-state polymer. The polymer solution and solid-state polymer thus obtained were subjected to the measurements as mentioned above. The measurement results are shown in Table 2-4.

Examples 50

The polymer solution obtained in Production Example 4 and an equivalent volume of water to that of the polymer solution were mixed in a rotatory dispersion machine (Cavitron 1010, volume V of mixing portion: $4 \times 10^{-6}$ m$^3$, manufactured by EUROTEC. CO., LTD.) having an engaging structure at 60° C. at a power P of 1 kw for $6 \times 10^{-4}$ seconds to obtain a solution mixture. At the time, the (P/V)·T1 value was 150. Note that sulfuric acid was added at the time of mixing the polymer solution obtained in Production Example 4 and water to control pH of the solution mixture to be 8.0.

The solution mixture thus obtained was fed to a tank heated at 60° C. and allowed to stand still to separate a polymer solution phase and a water phase. The state of separation was satisfactory.

The water phase was removed from the mixture to obtain the polymer solution. The polymer solution thus obtained was dried under vacuum to obtain a solid-state polymer. The polymer solution and solid-state polymer thus obtained were subjected to the measurements as mentioned above. The measurement results are shown in Table 2-4.

Examples 51 to 53

Each of the polymer solutions was obtained in the same manner as in Example 50 except that the (P/V)·T1 value of the mixing condition was changed to the value shown in Table 2-4. The polymer solution thus obtained was dried under vacuum to obtain a solid-state polymer. The polymer solution and solid-state polymer thus obtained were subjected to the measurements as mentioned above. The measurement results are shown in Table 2-4.

Examples 54

The polymer solution obtained in Production Example 4 and an equivalent volume of water to that of the polymer solution were mixed in a rotatory dispersion machine (Cavitron 1010, power P of 1 kw, volume V of mixing portion: $4 \times 10^{-6}$ m$^3$, manufactured by EUROTEC. CO., LTD.) having an engaging structure at 60° C. for 0.1 second to obtain a solution mixture. At the time, the (P/V)·T1 value was 25000. Note that sulfuric acid was added at the time of mixing the polymer solution obtained in Production Example 4 and water to control pH of the solution mixture to be 8.0.

To the obtained solution mixture, centrifugal acceleration was applied by a centrifugal machine (disk-type centrifugal machine, relative centrifugal acceleration rate: 5000 G, manufactured by Alfalaval) for 0.02 hours. At this time, the centrifugation condition (G·T2 value) was 100.

The solution mixture centrifuged was fed to a tank heated at 60° C. and allowed to stand still to separate a polymer solution phase and a water phase. The state of separation was satisfactory.

The water phase was removed from the mixture to obtain the polymer solution. The polymer solution thus obtained was dried under vacuum to obtain a solid-state polymer. The polymer solution and solid-state polymer thus obtained were subjected to the measurements as mentioned above. The measurement results are shown in Table 2-5.

Examples 55 to 57

Each of the polymer solutions was obtained in the same manner as in Example 54 except that the G·T2 value of the centrifugation condition was changed to the value shown in Table 2-5. The polymer solution thus obtained was dried under vacuum to obtain a solid-state polymer. The polymer solution and solid-state polymer thus obtained were subjected to the measurements as mentioned above. The measurement results are shown in Table 2-5.

Examples 58

The polymer solution obtained in Production Example 4 and an equivalent volume of water to that of the polymer solution were mixed in a rotatory dispersion machine (Cavitron 1010, power P of 1 kw, volume V of mixing portion: $4 \times 10^{-6}$ m$^3$, manufactured by EUROTEC. CO., LTD.) having an engaging structure at 60° C. for 0.1 second to obtain a solution mixture. At the time, the (P/V)·T1 value was 25000. Note that sulfuric acid was added at the time of mixing the polymer solution obtained in Production Example 4 and water to control pH of the solution mixture to be 8.0.

Subsequently, the water phase was separated and removed from the solution mixture by decanting to obtain the polymer solution. Note that the state of separation was satisfactory.

To the obtained solution mixture, centrifugal acceleration was applied by a centrifugal machine (disk-type centrifugal machine, relative centrifugal acceleration rate: 5000 G, manufactured by Alfalaval) for 0.04 hours. At this time, the centrifugation condition (G·T2 value) was 200.

The polymer solution thus centrifuged was dried under vacuum to obtain a solid-state polymer. The polymer solution and solid-state polymer thus obtained were subjected to the measurements as mentioned above. The measurement results are shown in Table 2-5.

Examples 59 to 61

Each of the polymer solutions was obtained in the same manner as in Example 58 except that the G·T2 value of the centrifugation condition was changed to the value shown in Table 2-5. The polymer solution thus obtained was dried under vacuum to obtain a solid-state polymer. The polymer solution and solid-state polymer thus obtained were subjected to the measurements as mentioned above. The measurement results are shown in Table 2-5.

Examples 62 and 63

Each of the polymer solutions was obtained in the same manner as in Example 60 except that the amount of sulfuric acid added at the time of mixing the polymer solution obtained in Production Example 4 and water was changed to control pH of the solution mixture as shown in Table 2-5. The polymer solution thus obtained was dried under vacuum to obtain a solid-state polymer. The polymer solution and solid-state polymer thus obtained were subjected to the measurements as mentioned above. The measurement results are shown in Table 2-5.

Example 64

A polymer solution was obtained in the same manner as in Example 60 except that the polymer solution obtained in Production Example 5 was used in place of the polymer solution obtained in Production Example 4. The polymer solution thus obtained was dried under vacuum to obtain a solid-state polymer. The polymer solution and solid-state polymer thus obtained were subjected to the measurements as mentioned above. The measurement results are shown in Table 2-5.

Example 65

A polymer solution was obtained in the same manner as in Example 60 except that the polymer solution obtained in Production Example 6 was used in place of the polymer solution obtained in Production Example 4. The polymer solution thus obtained was dried under vacuum to obtain a solid-state polymer. The polymer solution and solid-state polymer thus obtained were subjected to the measurements as mentioned above. The measurement results are shown in Table 2-5.

Example 66

A polymer solution was obtained in the same manner as in Example 43 except that the polymer solution obtained in Production Example 7 was used in place of the polymer solution obtained in Production Example 4. The polymer solution thus obtained was dried under vacuum to obtain a solid-state polymer. The polymer solution and solid-state polymer thus obtained were subjected to the measurements as mentioned above. The measurement results are shown in Table 2-6.

Examples 67 to 69

Each of the polymers was obtained in the same manner as in Example 66 except that sulfuric acid was added at the time of mixing the polymer solution obtained in Production Example 7 and water to control the pH of the solution mixture to be shown in Table 2-6. The polymer solution thus obtained was dried under vacuum to obtain a solid-state polymer. The polymer solution and solid-state polymer thus obtained were subjected to the measurements as mentioned above. The measurement results are shown in Table 2-6.

Example 70

A polymer solution was obtained in the same manner as in Example 58 except that the polymer solution obtained in Production Example 7 was used in place of the polymer solution obtained in Production Example 4. The polymer solution thus obtained was dried under vacuum to obtain a solid-state polymer. The polymer solution and solid-state polymer thus obtained were subjected to the measurements as mentioned above. The measurement results are shown in Table 2-6.

Examples 71 to 73

Each of the polymer solutions was obtained in the same manner as in Example 70 except that the G·T2 value of the centrifugation condition was changed to the value shown in Table 2-6. The polymer solution thus obtained was dried under vacuum to obtain a solid-state polymer. The polymer solution and solid-state polymer thus obtained were subjected to the measurements as mentioned above. The measurement results are shown in Table 2-6.

Example 74

A polymer solution was obtained in the same manner as in Example 60 except that the polymer solution obtained in Production Example 8 was used in place of the polymer solution obtained in Production Example 4. The polymer solution thus obtained was dried under vacuum to obtain a solid-state polymer. The polymer solution and solid-state polymer thus obtained were subjected to the measurements as mentioned above. The measurement results are shown in Table 2-6.

Example 75

A polymer solution was obtained in the same manner as in Example 60 except that the polymer solution obtained in Production Example 9 was used in place of the polymer solution obtained in Production Example 4. The polymer solution thus obtained was dried under vacuum to obtain a solid-state polymer. The polymer solution and solid-state polymer thus obtained were subjected to the measurements as mentioned above. The measurement results are shown in Table 2-6.

Comparative Example 7

A polymer was tried to be produced in the same manner as in Example 43 except that sulfuric acid was added at the time of mixing the polymer solution obtained in Production Example 4 and water to control the pH of the solution mixture to be 6.0. However, the solution mixture of the polymer solution obtained in Production Example 4 and water was emulsified and the next step cannot be carried out. The measurement results are shown in Table 2-7.

Comparative Example 8

A polymer solution was obtained in the same manner as in Example 43 except that sodium hydroxide was added at the time of mixing the polymer solution obtained in Production Example 4 and water to control pH of the water phase to be 11.0. The polymer solution thus obtained was dried under vacuum to obtain a solid-state polymer. The polymer solution and solid-state polymer thus obtained were subjected to the measurements as mentioned above. The measurement results are shown in Table 2-7.

Comparative Example 9

A polymer solution was obtained in the same manner as in Example 44 except that the mixing ratio of the polymer solution obtained in Production Example 4 and water (water/polymer solution (volume ratio)) was changed to 0.05. The polymer solution thus obtained was dried under vacuum to obtain a solid-state polymer. The polymer solution and solid-state polymer thus obtained were subjected to the measurements as mentioned above. The measurement results are shown in Table 2-7.

Comparative Example 10

A polymer solution was obtained in the same manner as in Example 45 except that the mixing ratio of the polymer solution obtained in Production Example 4 and water (volume ratio of water to the polymer solution obtained in Production Example 4) was changed to 15.0. The polymer solution thus obtained was dried under vacuum to obtain a solid-state polymer. The polymer solution and solid-state polymer thus obtained were subjected to the measurements as mentioned above. The measurement results are shown in Table 2-7.

Comparative Example 11

Each of the polymer solutions was obtained in the same manner as in Example 57 except that sulfuric acid was added at the time of mixing the polymer solution obtained in Production Example 4 and water to control pH of the solution mixture to be 6.0. The polymer solution thus obtained was dried under vacuum to obtain a solid-state polymer. The polymer solution and solid-state polymer thus obtained were subjected to the measurements as mentioned above. The measurement results are shown in Table 2-7.

Comparative Example 12

A polymer solution was obtained in the same manner as in Example 60 except that sodium hydroxide was added at the time of mixing the polymer solution obtained in Production Example 4 and water to control pH of the water phase to be 11.0. The polymer solution thus obtained was dried under vacuum to obtain a solid-state polymer. The polymer solution and solid-state polymer thus obtained were subjected to the measurements as mentioned above. The measurement results are shown in Table 2-7.

Comparative Example 13

A polymer solution was obtained in the same manner as in Example 60 except that the mixing ratio of the polymer solution obtained in Production Example 4 and water (volume ratio of water to the polymer solution obtained in Production Example 4) was changed to 0.05. The polymer solution thus obtained was dried under vacuum to obtain a solid-state polymer. The polymer solution and solid-state polymer thus obtained were subjected to the measurements as mentioned above. The measurement results are shown in Table 2-7.

Comparative Example 14

A polymer solution was obtained in the same manner as in Example 62 except that the mixing ratio of the polymer solution obtained in Production Example 4 and water (volume ratio of water to the polymer solution obtained in Production Example 4) was changed to 15.0. The polymer solution thus obtained was dried under vacuum to obtain a solid-state polymer. The polymer solution and solid-state polymer thus obtained were subjected to the measurements as mentioned above. The measurement results are shown in Table 2-7.

TABLE 2-1

|  | Step 1 Production Example | Step 2 pH of water phase of solution mixture | Water/ polymer solution (vol/vol) | Mixing method ((P/V)·T1 value) | Alcohol concentration of solution mixture (ppm) | Step 3 Centrifugation (G·T2 value) | Step A Water phase removal (separation by decanting) |
|---|---|---|---|---|---|---|---|
| Example 1 | 2 | 9.5 | 1.0 | In-line mixer (no driving portion) | 217 | None | None |
| Example 2 | 2 | 8.0 | 1.0 | In-line mixer (no driving portion) | 223 | None | None |
| Example 3 | 2 | 7.0 | 1.0 | In-line mixer (no driving portion) | 210 | None | None |
| Example 4 | 2 | 6.0 | 1.0 | In-line mixer (no driving portion) | 214 | None | None |
| Example 5 | 2 | 5.0 | 1.0 | In-line mixer (no driving portion) | 205 | None | None |
| Example 6 | 2 | 8.0 | 0.5 | In-line mixer (no driving portion) | 302 | None | None |
| Example 7 | 2 | 8.0 | 2.0 | In-line mixer (no driving portion) | 102 | None | None |
| Example 8 | 2 | 8.0 | 5.0 | In-line mixer (no driving portion) | 58 | None | None |
| Example 9 | 2 | 8.0 | 1.0 | 150 | 203 | None | None |
| Example 10 | 2 | 8.0 | 1.0 | 5000 | 211 | None | None |
| Example 11 | 2 | 8.0 | 1.0 | 25000 | 221 | None | None |
| Example 12 | 2 | 8.0 | 1.0 | 600000 | 216 | None | None |
| Example 13 | 2 | 8.0 | 1.0 | 25000 | 214 | 100 | None |
| Example 14 | 2 | 8.0 | 1.0 | 25000 | 210 | 500 | None |
| Example 15 | 2 | 8.0 | 1.0 | 25000 | 220 | 2000 | None |

TABLE 2-1-continued

| | | | | | | | |
|---|---|---|---|---|---|---|---|
| Example 16 | 2 | 8.0 | 1.0 | 25000 | 221 | 5000 | None |
| Example 17 | 2 | 8.0 | 1.0 | 25000 | 216 | 200 | Separated |
| Example 18 | 2 | 8.0 | 1.0 | 25000 | 214 | 1000 | Separated |
| Example 19 | 2 | 8.0 | 1.0 | 25000 | 212 | 4000 | Separated |
| Example 20 | 2 | 8.0 | 1.0 | 25000 | 215 | 10000 | Separated |
| Example 21 | 2 | 7.0 | 1.0 | 25000 | 216 | 4000 | Separated |
| Example 22 | 2 | 5.5 | 1.0 | 25000 | 215 | 4000 | Separated |

| | Metal amount (ppm) | | | | Effect | | | | |
|---|---|---|---|---|---|---|---|---|---|
| | Li | Ti | Al | total | Color tone | Color tone after heating | Transparency | Water amount | Filter clogging |
| Example 1 | 62 | 66 | — | 128 | A | B | B | AA | A |
| Example 2 | 52 | 63 | — | 115 | A | B | A | AA | A |
| Example 3 | 44 | 55 | — | 99 | A | B | A | AA | AA |
| Example 4 | 36 | 51 | — | 87 | B | B | A | AA | AA |
| Example 5 | 27 | 44 | — | 71 | B | B | AA | AA | AA |
| Example 6 | 57 | 66 | — | 123 | AA | B | B | AA | A |
| Example 7 | 49 | 64 | — | 113 | AA | B | A | AA | A |
| Example 8 | 43 | 63 | — | 106 | AA | B | A | AA | A |
| Example 9 | 49 | 59 | — | 108 | AA | B | A | AA | A |
| Example 10 | 43 | 54 | — | 97 | AA | B | A | AA | AA |
| Example 11 | 39 | 51 | — | 90 | AA | B | A | AA | AA |
| Example 12 | 33 | 45 | — | 78 | AA | B | AA | AA | AA |
| Example 13 | 35 | 47 | — | 82 | AA | B | AAA | AAA | AA |
| Example 14 | 29 | 42 | — | 71 | AA | B | AAA | AAA | AA |
| Example 15 | 24 | 39 | — | 63 | AAA | AA | AAA | AAA | AA |
| Example 16 | 19 | 34 | — | 53 | AAA | AA | AAA | AAA | AAA |
| Example 17 | 31 | 45 | — | 76 | AAA | AA | AAA | AAA | AA |
| Example 18 | 26 | 38 | — | 64 | AAA | AA | AAA | AAA | AA |
| Example 19 | 20 | 35 | — | 55 | AAA | AA | AAA | AAA | AAA |
| Example 20 | 14 | 30 | — | 44 | AAA | AAA | AAA | AAA | AAA |
| Example 21 | 16 | 32 | — | 48 | AA | AA | AAA | AAA | AAA |
| Example 22 | 10 | 29 | — | 39 | A | A | AAA | AAA | AAA |

TABLE 2-2

| | Step 1 Production Example | Step 2 | | | | Step 3 Centrifugation (G · T2 value) | Step A Water phase removal (separation by decanting) |
|---|---|---|---|---|---|---|---|
| | | pH of water phase of solution mixture | Water/ polymer solution (vol/vol) | Mixing method ((P/V) · T1 value) | Alcohol concentration of solution mixture (ppm) | | |
| Example 23 | 3 | 9.5 | 1.0 | 25000 | 218 | None | None |
| Example 24 | 3 | 8.0 | 1.0 | 25000 | 219 | None | None |
| Example 25 | 3 | 7.0 | 1.0 | 25000 | 210 | None | None |
| Example 26 | 3 | 6.0 | 1.0 | 25000 | 218 | None | None |

TABLE 2-2-continued

| | | | | | | | |
|---|---|---|---|---|---|---|---|
| Example 27 | 3 | 5.0 | 1.0 | 25000 | 222 | None | None |
| Example 28 | 3 | 9.5 | 1.0 | 25000 | 214 | 4000 | Separated |
| Example 29 | 3 | 8.0 | 1.0 | 25000 | 216 | 4000 | Separated |
| Example 30 | 3 | 7.0 | 1.0 | 25000 | 215 | 4000 | Separated |
| Example 31 | 3 | 6.0 | 1.0 | 25000 | 212 | 4000 | Separated |
| Example 32 | 3 | 5.0 | 1.0 | 25000 | 220 | 4000 | Separated |

| | Metal amount (ppm) | | | | Effect | | | | |
|---|---|---|---|---|---|---|---|---|---|
| | Li | Ti | Al | total | Color tone | Color tone after heating | Transparency | Water amount | Filter clogging |
| Example 23 | 40 | 57 | 16 | 113 | AA | B | A | AA | AA |
| Example 24 | 36 | 54 | 15 | 105 | AA | B | A | AA | AA |
| Example 25 | 31 | 52 | 13 | 96 | A | B | A | AA | AA |
| Example 26 | 27 | 47 | 11 | 85 | B | B | A | AA | AA |
| Example 27 | 22 | 43 | 9 | 74 | B | B | AA | AA | AA |
| Example 28 | 16 | 35 | 7 | 58 | AAA | AA | AAA | AAA | AAA |
| Example 29 | 13 | 32 | 5 | 50 | AAA | AAA | AAA | AAA | AAA |
| Example 30 | 10 | 28 | 4 | 42 | AA | AA | AAA | AAA | AAA |
| Example 31 | 8 | 25 | 3 | 36 | AA | AA | AAA | AAA | AAA |
| Example 32 | 6 | 23 | 2 | 31 | AA | AA | AAA | AAA | AAA |

TABLE 2-3

| | Step 1 Production Example | Step 2 pH of water phase of solution mixture | Water/polymer solution (vol/vol) | Mixing method ((P/V)·T1 value) | Alcohol concentration of solution mixture (ppm) | Step 3 Centrifugation (G·T2 value) | Step A Water phase removal (separation by decanting) |
|---|---|---|---|---|---|---|---|
| Example 33 | 1 | 9.5 | 1.0 | 25000 | 210 | None | None |
| Example 34 | 1 | 8.0 | 1.0 | 25000 | 208 | None | None |
| Example 35 | 1 | 7.0 | 1.0 | 25000 | 214 | None | None |
| Example 36 | 1 | 6.0 | 1.0 | 25000 | 215 | None | None |
| Example 37 | 1 | 5.0 | 1.0 | 25000 | 217 | None | None |
| Example 38 | 1 | 9.5 | 1.0 | 25000 | 220 | 5000 | Separated |
| Example 39 | 1 | 8.0 | 1.0 | 25000 | 218 | 5000 | Separated |
| Example 40 | 1 | 7.0 | 1.0 | 25000 | 214 | 5000 | Separated |
| Example 41 | 1 | 6.0 | 1.0 | 25000 | 212 | 5000 | Separated |
| Example 42 | 1 | 5.0 | 1.0 | 25000 | 210 | 5000 | Separated |
| Comparative Example 1 | 2 | 11.0 | 1.0 | In-line mixer (no driving portion) | 214 | None | None |
| Comparative | 2 | 8.0 | 0.05 | In-line | 402 | None | None |

TABLE 2-3-continued

| | | | | | | | |
|---|---|---|---|---|---|---|---|
| Example 2 | | | | mixer (no driving portion) | | | |
| Comparative Example 3 | 2 | 7.0 | 15.0 | In-line mixer (no driving portion) | 15 | None | None |
| Comparative Example 4 | 2 | 11.0 | 1.0 | 25000 | 212 | 5000 | Separated |
| Comparative Example 5 | 2 | 8.0 | 0.05 | 25000 | 412 | 5000 | Separated |
| Comparative Example 6 | 2 | 7.0 | 15.0 | 25000 | 13 | 5000 | Separated |

| | Metal amount (ppm) | | | | Effect | | | | |
|---|---|---|---|---|---|---|---|---|---|
| | Li | Ti | Al | total | Color tone | Color tone after heating | Transparency | Water amount | Filter clogging |
| Example 33 | 40 | — | — | 40 | AAA | AAA | AAA | AA | AAA |
| Example 34 | 34 | — | — | 34 | AAA | AAA | AAA | AA | AAA |
| Example 35 | 29 | — | — | 29 | AA | A | AAA | AA | AAA |
| Example 36 | 26 | — | — | 26 | A | A | AAA | AA | AAA |
| Example 37 | 22 | — | — | 22 | A | A | AAA | AA | AAA |
| Example 38 | 16 | — | — | 16 | AAA | AAA | AAA | AAA | AAA |
| Example 39 | 12 | — | — | 12 | AAA | AAA | AAA | AAA | AAA |
| Example 40 | 9 | — | — | 9 | AA | AA | AAA | AAA | AAA |
| Example 41 | 5 | — | — | 5 | A | A | AAA | AAA | AAA |
| Example 42 | 2 | — | — | 2 | A | A | AAA | AAA | AAA |
| Comparative Example 1 | 104 | 91 | — | 195 | B | C | C | AA | B |
| Comparative Example 2 | 109 | 94 | — | 203 | B | C | C | C Insufficient separation | C |
| Comparative Example 3 | 108 | 94 | — | 202 | C | C | C | C Insufficient separation | C |
| Comparative Example 4 | 102 | 85 | — | 187 | B | C | B | AAA | B |
| Comparative Example 5 | 100 | 84 | — | 184 | A | B | B | C Insufficient separation | B |
| Comparative Example 6 | 101 | 85 | — | 186 | C | C | B | C Insufficient separation | B |

TABLE 2-4

| | Step 1 Production Example | Step 2 | | | | Step 3 Centrifugation (G · T2 value) | Step A Water phase removal (separation by decanting) |
|---|---|---|---|---|---|---|---|
| | | pH of water phase of solution mixture | Water/ polymer solution (vol/vol) | Mixing method ((P/V) · T1 value) | Alcohol concentration of solution mixture (ppm) | | |
| Example 43 | 4 | 9.5 | 1.0 | In-line mixer (no driving portion) | 212 | None | None |
| Example 44 | 4 | 8.0 | 1.0 | In-line mixer (no driving portion) | 213 | None | None |

TABLE 2-4-continued

| | Step 1 Production Example | pH of water phase of solution mixture | Water/polymer solution (vol/vol) | Mixing method | Alcohol concentration of solution mixture (ppm) | Step 3 Centrifugation (G · T2 value) | Step A Water phase removal (separation by decanting) |
|---|---|---|---|---|---|---|---|
| Example 45 | 4 | 7.0 | 1.0 | In-line mixer (no driving portion) | | 211 | None | None |
| Example 46 | 4 | 5.0 | 1.0 | In-line mixer (no driving portion) | | 217 | None | None |
| Example 47 | 4 | 8.0 | 0.5 | In-line mixer (no driving portion) | | 312 | None | None |
| Example 48 | 4 | 8.0 | 2.0 | In-line mixer (no driving portion) | | 114 | None | None |
| Example 49 | 4 | 8.0 | 5.0 | In-line mixer (no driving portion) | | 54 | None | None |
| Example 50 | 4 | 8.0 | 1.0 | | 150 | 212 | None | None |
| Example 51 | 4 | 8.0 | 1.0 | | 5000 | 214 | None | None |
| Example 52 | 4 | 8.0 | 1.0 | | 25000 | 211 | None | None |
| Example 53 | 4 | 8.0 | 1.0 | | 600000 | 213 | None | None |

| | Metal amount (ppm) | | | | | Effect | | | | |
|---|---|---|---|---|---|---|---|---|---|---|
| | Li | Ti | Ni | Al | total | Color tone | Color tone after heating | Transparency | Water amount | Filter clogging |
| Example 43 | 52 | 65 | — | 63 | 180 | A | B | B | AA | B |
| Example 44 | 46 | 63 | — | 60 | 169 | A | B | B | AA | B |
| Example 45 | 37 | 56 | — | 52 | 145 | A | B | B | AA | A |
| Example 46 | 21 | 45 | — | 45 | 111 | B | B | A | AA | A |
| Example 47 | 51 | 65 | — | 61 | 177 | A | B | B | AA | B |
| Example 48 | 41 | 64 | — | 61 | 166 | A | B | B | AA | B |
| Example 49 | 36 | 64 | — | 59 | 159 | A | B | B | AA | B |
| Example 50 | 41 | 60 | — | 58 | 159 | A | B | B | AA | B |
| Example 51 | 36 | 55 | — | 52 | 143 | A | B | B | AA | A |
| Example 52 | 32 | 52 | — | 48 | 132 | AA | A | B | AA | A |
| Example 53 | 27 | 47 | — | 43 | 117 | AA | A | A | AA | A |

TABLE 2-5

| | Step 1 Production Example | Step 2 | | | | Step 3 Centrifugation (G · T2 value) | Step A Water phase removal (separation by decanting) |
|---|---|---|---|---|---|---|---|
| | | pH of water phase of solution mixture | Water/polymer solution (vol/vol) | Mixing method ((P/V) · T1 value) | Alcohol concentration of solution mixture (ppm) | | |
| Example 54 | 4 | 8.0 | 1.0 | 25000 | 214 | 100 | None |
| Example 55 | 4 | 8.0 | 1.0 | 25000 | 220 | 500 | None |
| Example 56 | 4 | 8.0 | 1.0 | 25000 | 221 | 2000 | None |
| Example 57 | 4 | 8.0 | 1.0 | 25000 | 209 | 5000 | None |

TABLE 2-5-continued

| | | | | | | | |
|---|---|---|---|---|---|---|---|
| Example 58 | 4 | 8.0 | 1.0 | 25000 | 216 | 200 | Separated |
| Example 59 | 4 | 8.0 | 1.0 | 25000 | 214 | 1000 | Separated |
| Example 60 | 4 | 8.0 | 1.0 | 25000 | 213 | 4000 | Separated |
| Example 61 | 4 | 8.0 | 1.0 | 25000 | 216 | 10000 | Separated |
| Example 62 | 4 | 7.0 | 1.0 | 25000 | 214 | 4000 | Separated |
| Example 63 | 4 | 5.5 | 1.0 | 25000 | 217 | 4000 | Separated |
| Example 64 | 5 | 8.0 | 1.0 | 25000 | 210 | 4000 | Separated |
| Example 65 | 6 | 8.0 | 1.0 | 25000 | 213 | 4000 | Separated |

| | Metal amount (ppm) | | | | | Effect | | | | |
|---|---|---|---|---|---|---|---|---|---|---|
| | Li | Ti | Ni | Al | total | Color tone | Color tone after heating | Transparency | Water amount | Filter clogging |
| Example 54 | 29 | 48 | — | 44 | 121 | AA | A | AA | AAA | A |
| Example 55 | 24 | 43 | — | 40 | 107 | AA | A | AA | AAA | AA |
| Example 56 | 19 | 38 | — | 36 | 93 | AA | A | AA | AAA | AA |
| Example 57 | 16 | 35 | — | 31 | 82 | AA | AA | AA | AAA | AA |
| Example 58 | 25 | 46 | — | 41 | 112 | AA | A | AA | AAA | AA |
| Example 59 | 21 | 39 | — | 35 | 95 | AAA | AA | AA | AAA | AA |
| Example 60 | 16 | 36 | — | 33 | 85 | AAA | AA | AA | AAA | AA |
| Example 61 | 13 | 31 | — | 27 | 71 | AAA | AAA | AAA | AAA | AA |
| Example 62 | 13 | 32 | — | 29 | 74 | AA | AA | AAA | AAA | AA |
| Example 63 | 8 | 30 | — | 26 | 64 | A | A | AAA | AAA | AAA |
| Example 64 | 15 | 35 | — | 12 | 62 | AA | AA | AAA | AAA | AAA |
| Example 65 | 17 | 37 | — | 67 | 121 | A | B | A | AAA | A |

TABLE 2-6

| | Step 1 Production Example | Step 2 | | | | Step 3 Centrifugation (G · T2 value) | Step A Water phase removal (separation by decanting) |
|---|---|---|---|---|---|---|---|
| | | pH of water phase of solution mixture | Water/ polymer solution (vol/vol) | Mixing method ((P/V) · T1 value) | Alcohol concentration of solution mixture (ppm) | | |
| Example 66 | 7 | 9.5 | 1.0 | In-line mixer (no driving portion) | 213 | None | None |
| Example 67 | 7 | 8.0 | 1.0 | In-line mixer (no driving portion) | 215 | None | None |
| Example 68 | 7 | 7.0 | 1.0 | In-line mixer (no driving portion) | 214 | None | None |
| Example 69 | 7 | 5.0 | 1.0 | In-line mixer (no driving portion) | 218 | None | None |
| Example 70 | 7 | 8.0 | 1.0 | 25000 | 214 | 200 | Separated |
| Example 71 | 7 | 8.0 | 1.0 | 25000 | 211 | 1000 | Separated |
| Example | 7 | 8.0 | 1.0 | 25000 | 219 | 4000 | Separated |

TABLE 2-6-continued

| | | | | | | | |
|---|---|---|---|---|---|---|---|
| 72 | | | | | | | |
| Example 73 | 7 | 8.0 | 1.0 | 25000 | 215 | 10000 | Separated |
| Example 74 | 8 | 8.0 | 1.0 | 25000 | 216 | 4000 | Separated |
| Example 75 | 9 | 8.0 | 1.0 | 25000 | 218 | 4000 | Separated |

| | Metal amount (ppm) | | | | | Effect | | | | |
|---|---|---|---|---|---|---|---|---|---|---|
| | Li | Ti | Ni | Al | total | Color tone | Color tone after heating | Transparency | Water amount | Filter clogging |
| Example 66 | 52 | — | 64 | 62 | 178 | B | B | B | AA | B |
| Example 67 | 45 | — | 62 | 60 | 167 | B | B | B | AA | B |
| Example 68 | 36 | — | 54 | 53 | 143 | B | B | B | AA | A |
| Example 69 | 20 | — | 43 | 45 | 108 | A | B | A | AA | A |
| Example 70 | 24 | — | 45 | 39 | 108 | A | B | AA | AAA | A |
| Example 71 | 20 | — | 38 | 34 | 92 | AAA | AA | AAA | AAA | AA |
| Example 72 | 15 | — | 35 | 31 | 81 | AAA | AA | AAA | AAA | AA |
| Example 73 | 12 | — | 30 | 27 | 69 | AAA | AAA | AAA | AAA | AA |
| Example 74 | 14 | — | 34 | 11 | 59 | AAA | AAA | AAA | AAA | AAA |
| Example 75 | 16 | — | 36 | 64 | 116 | A | B | AA | AAA | A |

TABLE 2-7

| | Step 1 Production Example | Step 2 | | | | Step 3 Centrifugation (G · T2 value) | Step A Water phase removal (separation by decanting) |
|---|---|---|---|---|---|---|---|
| | | pH of water phase of solution mixture | Water/ polymer solution (vol/vol) | Mixing method ((P/V) · T1 value) | Alcohol concentration of solution mixture (ppm) | | |
| Comparative Example 7 | 4 | 6.0 | 1.0 | In-line mixer (no driving portion) | 214 | None | None |
| Comparative Example 8 | 4 | 11.0 | 1.0 | In-line mixer (no driving portion) | 211 | None | None |
| Comparative Example 9 | 4 | 8.0 | 0.05 | In-line mixer (no driving portion) | 401 | None | None |
| Comparative Example 10 | 4 | 7.0 | 15.0 | In-line mixer (no driving portion) | 17 | None | None |
| Comparative Example 11 | 4 | 6.0 | 1.0 | 25000 | 218 | 5000 | None |
| Comparative Example 12 | 4 | 11.0 | 1.0 | 25000 | 216 | 4000 | Separated |
| Comparative Example 13 | 4 | 8.0 | 0.05 | 25000 | 406 | 4000 | Separated |
| Comparative Example 14 | 4 | 7.0 | 15.0 | 25000 | 15 | 4000 | Separated |

| | Metal amount (ppm) | Color | Color tone after | Water | Filter |
|---|---|---|---|---|---|

TABLE 2-7-continued

| | Li | Ti | Ni | Al | total | tone | heating | Transparency | amount | clogging |
|---|---|---|---|---|---|---|---|---|---|---|
| Comparative Example 7 | | Emulsified | | | | Emulsified | Emulsified | Emulsified | Emulsified | Emulsified |
| Comparative Example 8 | 86 | 92 | — | 91 | 269 | B | C | C | A | C |
| Comparative Example 9 | 93 | 95 | — | 92 | 280 | C | C | C | C Insufficient separation | C |
| Comparative Example 10 | 92 | 93 | — | 91 | 276 | C | C | C | C Insufficient separation | C |
| Comparative Example 11 | 79 | 86 | — | 85 | 250 | C | C | B | A | C |
| Comparative Example 12 | 85 | 85 | — | 83 | 253 | B | C | B | A | C |
| Comparative Example 13 | 84 | 86 | — | 84 | 254 | B | C | B | A | C |
| Comparative Example 14 | 82 | 83 | — | 82 | 247 | C | C | B | A | C |

The present application was based on Japanese Patent Application Nos. 2012-244624 and 2012-244626 filed Nov. 6, 2012 with the Japan Patent Office, the contents of which are incorporated herein by reference.

INDUSTRIAL APPLICABILITY

The present invention has industrial applicability as a method for producing a polymer containing less metal residue.

The invention claimed is:

1. A method of producing a polymer, comprising
a first step of preparing a polymer solution containing one or more metals selected from the group consisting of aluminum, lithium and titanium;
a second step of obtaining a solution mixture by mixing the polymer solution and water in a volume ratio of 0.1 to 10 based on the polymer solution;
after the second step, an intermediate step of separating and removing a water phase from the solution mixture to produce a resulting solution mixture; and
after the intermediate step, a third step of applying centrifugal acceleration to the resulting solution mixture without adding an additional water phase prior to applying the centrifugal acceleration, wherein
in the first step, when an aluminum content in a polymer contained in the polymer solution is less than 30 ppm, a pH of the water phase of the solution mixture is controlled to be 10 or less in the second step, and
in the first step, when the aluminum content in the polymer contained in the polymer solution is 30 ppm or more and 200 ppm or less, the pH of the water phase of the solution mixture is controlled to be 5.5 or less, or 7 to 10 in the second step.

2. The method of producing the polymer according to claim 1, wherein the polymer solution in the first step contains titanium.

3. The method of producing the polymer according to claim 1, wherein the polymer solution in the first step contains lithium and titanium.

4. The method of producing the polymer according to claim 1, wherein, in the second step, the mixing of the polymer solution and the water is performed in a condition: $(P/V) \cdot T \geq 100$ wherein P represents a power (kw), V represents a volume (m3) and T represents a mixing time (sec).

5. The method of producing the polymer according to claim 1, wherein, in the second step, the mixing of the polymer solution and the water is performed in the condition: $30000 \geq (P/V) \cdot T \geq 1000$ wherein P represents a power (kw), V represents a volume (m3) and T represents a mixing time (sec).

6. The method of producing the polymer according to claim 1, wherein, in the second step, the pH of the water phase of the solution mixture is controlled to be 7 to 8.5.

7. The method of producing the polymer according to claim 1, wherein, in the second step, an inorganic acid is further mixed.

8. The method of producing the polymer according to claim 7, wherein the inorganic acid comprises at least one selected from the group consisting of hydrochloric acid, sulfuric acid, nitric acid and phosphoric acid.

9. The method of producing the polymer according to claim 1, wherein, in the second step, a content of an alcohol in the solution mixture is 5 weight % or less.

10. The method of producing the polymer according to claim 1, wherein, in the third step, centrifugal acceleration is applied in a condition of $0.01 \geq (G \cdot T2) \geq 5000$ where G represents a centrifugal acceleration rate and T2 represents a centrifugation time (hr).

11. The method of producing the polymer according to claim 1, wherein, in the second step, a content of an alcohol in the solution mixture is 500 ppm or less.

12. A method of producing a polymer, comprising
a first step of preparing a polymer solution containing one or more metals selected from the group consisting of aluminum, lithium and titanium;
a second step of obtaining a solution mixture by mixing the polymer solution and water in a volume ratio of 0.1 to 10 based on the polymer solution;
a third step of separating and removing a water phase from the solution mixture, wherein the water phase is not recycled; and
a fourth step of removing a metal residue from the polymer solution by applying centrifugal acceleration to the polymer solution, wherein
   in the first step, when an aluminum content in a polymer contained in the polymer solution is less than 30 ppm, a pH of the water phase of the solution mixture is controlled to be 10 or less in the second step, and
   in the first step, when the aluminum content in the polymer contained in the polymer solution is 30 ppm or more and 200 ppm or less, the pH of the water phase of the solution mixture is controlled to be 5.5 or less, or 7 to 10 in the second step.

* * * * *